US011952829B1

(12) United States Patent
Chen et al.

(10) Patent No.: US 11,952,829 B1
(45) Date of Patent: Apr. 9, 2024

(54) ADJUSTABLE DOOR SILL

(71) Applicant: QINGDAO SEA NOVA BUILDING PROFILES PRODUCTS CO., LTD., Jiaozhou (CN)

(72) Inventors: Minghui Chen, Jiaozhou (CN); Yi Cao, Jiaozhou (CN); James William Meeks, Eaton, OH (US); Xuhui Wu, Jiaozhou (CN)

(73) Assignee: QINGDAO SEA NOVA BUILDING PROFILES PRODUCTS CO., LTD., Jiaozhou (CN)

( * ) Notice: Subject to any disclaimer, the term of this patent is extended or adjusted under 35 U.S.C. 154(b) by 0 days.

(21) Appl. No.: 18/088,661

(22) Filed: Dec. 26, 2022

(30) Foreign Application Priority Data

Nov. 2, 2022 (CN) ........................ 202211360066.2

(51) Int. Cl.
*E06B 1/70* (2006.01)

(52) U.S. Cl.
CPC ..................................... *E06B 1/70* (2013.01)

(58) Field of Classification Search
CPC ........................................................ E06B 1/70
See application file for complete search history.

(56) References Cited

U.S. PATENT DOCUMENTS 4,074,464 A * 2/1978 McCay ..................... E06B 1/70 49/468
4,387,535 A * 6/1983 Corbo ....................... E06B 1/70 49/468
5,588,266 A * 12/1996 Headrick .................. E06B 1/70 49/467
6,345,477 B1 * 2/2002 Kepler ...................... E06B 1/70 49/468
8,490,332 B2 * 7/2013 Van Camp ................ E06B 1/70 49/468
10,612,291 B2 * 4/2020 Bryant ...................... E06B 1/70
11,047,165 B1 * 6/2021 Monts De Oca ......... E06B 1/70
2004/0200153 A1 * 10/2004 Khanlarian ............... E06B 1/70 49/468
2006/0053695 A1 * 3/2006 Palenske .................. E06B 1/70 49/468
2006/0112644 A1 * 6/2006 Pepper ...................... E06B 1/70 49/468
2008/0229669 A1 * 9/2008 Abdollahzadeh ......... E06B 1/70 49/468
2010/0257789 A1 * 10/2010 Meeks ...................... E06B 1/70 49/468

(Continued)

*Primary Examiner* — Marcus Menezes

(57) ABSTRACT

The door sill includes a sill deck and a rail carrier assembly having a function of height adjustment. The rail carrier assembly is configured on the sill deck. The rail carrier assembly includes a rail cap, a rail carrier, an adjustment nut and an adjustment screw. The rail cap is snapped onto an upper end of the rail carrier. A groove is formed in the sill deck for the rail carrier to fit in. A nut installation hole is formed in the rail carrier. The adjustment nut is assembled at the nut installation hole, and is in threaded fit with the adjustment screw. The adjustment screw drives the adjustment nut to move up or down in an axial direction of the adjustment screw through rotation, thereby altering the height of the rail carrier fitted in the groove and altering the height of the rail cap.

20 Claims, 24 Drawing Sheets

(56) References Cited

U.S. PATENT DOCUMENTS

| | | | | |
|---|---|---|---|---|
| 2012/0180397 | A1* | 7/2012 | Van Camp | E06B 1/70 49/467 |
| 2015/0052820 | A1* | 2/2015 | Van Camp | E06B 1/70 49/468 |
| 2017/0101817 | A1* | 4/2017 | Swank | G06F 11/079 |
| 2018/0266168 | A1* | 9/2018 | Jetton | E06B 1/70 |
| 2019/0218849 | A1* | 7/2019 | Bryant | E06B 1/70 |

* cited by examiner

ADJUSTABLE DOOR SILL

RELATED APPLICATION

The application claims the benefit of the Chinese Patent Application CN202211360066.2 filed Nov. 2, 2022, which is incorporated herein by reference in its entirety.

FIELD OF THE INVENTION

The present invention relates to the technical field of door sills, more particularly to a height-adjustable door sill.

BACKGROUND OF THE INVENTION

A door sill, which is a sill product that integrates a sill and a deck, is widely used in various doors, such as swing doors, sliding doors and air-tight doors, and involves many fields, such as household supplies, public facilities, car and marine facilities, etc.

Nowadays, there are many kinds of door sills sold and used in the market, and our company has selected three representative door sill products in the market (FIGS. 1-9) for illustration.

The three door sills have similar sill decks, and mainly differ from each other in the rail carrier assemblies for fitting with the sill decks. For the convenience of subsequent description and distinction, the three door sills are referred to, respectively, as a door sill I, a door sill II and a door sill III.

First, the door sill I (FIGS. 1-3) will be described. The rail carrier assembly of the door sill I includes a rail cap I 18, a rail carrier I 19, a retainer clip I 20, an adjustment nut I 21 and an adjustment screw I 22. The assembly process of the rail carrier assembly specifically includes the following four steps: b1, press fit: the rail carrier I 19 is press-fitted into the rail cap I 18 to form a whole; b2, assembly of screw: the adjustment screw I 22 is inserted into a through hole in the middle of the rail cap I 18 and the rail carrier I 19; b3, forced fit of retainer clip: the retainer clip I 20 is press-fitted with the adjustment screw I 22 and fixedly connected to the adjustment screw I 22, such that the retainer clip I 20 supports the rail cap I 18 and the rail carrier I 19; and b4, tightening of nut: the adjustment nut I 21 is tightened with the adjustment screw I 22.

Through analysis based on the structural characteristics and the assembly process of the rail carrier assembly, the door sill I has the following defects. Firstly, the installation process of the rail carrier assembly is complex. Secondly, the adjustment screw I 22 is exposed. The exposure facilitates the adjustment of the sill, but seriously affects the imperviousness of the door sill, making the door sill prone to leakage and directly affecting the service life of the door sill. Thirdly, the rail cap I 18 and the rail carrier I 19 are supported mainly by the retainer clip I 20. If the retainer clip I 20 is loosened from the adjustment screw I 22, the adjustment screw I 22 will slide in the rail cap I 18 and the rail carrier I 19, such that the height adjustment function of the rail carrier assembly of the door sill I may be disabled or partially disabled. Fourth, the adjustment nut I 21 has a U-shaped structure, and has a very small contact area with the sill deck, resulting in an increase in the intensity of pressure. In the actual use, the contact between the adjustment nut I 21 and the sill deck may cause heavy wear, and therefore the service life of the door sill I will be greatly affected. Fifthly, the exposure of the adjustment screw I 22 makes the door sill I unaesthetic.

As to the door sill II (FIGS. 4-6), the rail carrier assembly of the door sill II includes a rail carrier II 23, a retainer clip II 24, an adjustment screw II 25 and a sealing strip II 26. The assembly process of the rail carrier assembly specifically includes the following four steps: c1, assembly of screw: the adjustment screw II 25 is assembled into a through hole in the middle of the rail carrier II 23; c2, forced fit of retainer clip: the retainer clip II 24 is press-fitted with the adjustment screw II 25 and fixedly connected to the adjustment screw II 25, such that the retainer clip II 24 supports the rail carrier II 23; c3, press-in of sealing strip: the sealing strip II 26 is pressed into a groove in a side surface of the rail carrier II 23; and c4, connection of nut: the assembled adjustment screw II 25 is screwed with the adjustment nut II 31 at the sill deck.

Through analysis based on the structural characteristics and the assembly process of the rail carrier assembly, the door sill II has the following defects. Firstly, although the rail cap is omitted, the installation process of the rail carrier assembly is still complex because the number of steps is not reduced. Secondly, the adjustment screw II 25 is still exposed, making the door sill II still prone to leakage like the door sill I. Thirdly, the rail carrier II 23 still needs to be supported by the retainer clip II 24, so there is still a risk of loosening to affect the height adjustment function of the door sill II. Fourthly, although step c4 intends to describe the assembly of the rail carrier assembly and the sill deck, it is actually the connection between the adjustment screw II 25 and the adjustment nut II 31. The nut in the rail carrier assembly of the door sill II is not completely omitted, but is transferred to the sill deck. Therefore, in essence, such a configuration does not simplify the technical process, but increases the number of steps and difficulty in the production process of the sill deck profile (drilling and tapping). Fifthly, similarly, the exposure of the adjustment screw II 25 makes the door sill II unaesthetic.

As to the door sill III (FIGS. 7-9), the rail carrier assembly of the door sill III includes a rail cap III 27, a rail carrier III 28, an adjustment screw III 29 and a screw cover III 30. The assembly process of the rail carrier assembly specifically includes the following four steps: d1, assembly of screw: the adjustment screw III 29 is installed into a through hole in the middle of the rail carrier III 28 and then fixed; d2, installation of rail cap: the rail cap III 27 is snapped into an upper end of the rail carrier III 28; d3, connection of nut: the assembled adjustment screw III 29 is screwed into the adjustment nut III 32 at the sill deck; and d4, closing of rail cap: the screw cover III 30 is installed to an adjustment hole for height adjustment that is pre-formed in the middle of the rail cap III 27.

Through analysis based on the structural characteristics and the assembly process of the rail carrier assembly, the number of installation steps of the rail carrier assembly of the door sill III is the same as that of the door sill I and the door sill II, but the technical solution is more complex than the technical solutions of the door sill I and the door sill II in other aspects. The door sill III specifically has the following defects. Firstly, with reference to FIG. 7 and FIG. 8, in the rail carrier assembly of the door sill III, the rail carrier III 28 and the adjustment screw III 29 are connected not by means of a retainer clip, but by embedment. There are typically two solutions to achieve this embedment. One is to design an adjustment screw III 29 with a multi-piece structure. However, this solution may greatly increase the processing difficulty and assembling difficulty of the adjustment screw III 29. In the other solution, the rail carrier III 28 is provided with a specially-shaped hole that allows the adjustment screw III 29 to run into the specially-shaped hole from one side (with a larger diameter) and slide to an installation position at the other side (with a smaller diameter) to complete the embedment. However, this solution may increase the processing difficulty of the rail carrier. Secondly, the installation process of the rail carrier assembly is not simplified. Thirdly, like the door sill II, the nut is not completely omitted from the door sill III, but is transferred to the sill deck, and such a configuration, in essence, does not simplify the technical process. Fourthly, the added screw cover III 30 overcomes the defect of proneness to leakage to some extent, but there is still a risk of leakage. Fifthly, the appearance of the door sill III is improved as compared with the door sill I and the door sill II, but still not aesthetic enough.

Based on the above, our company believes that all such door sills sold and used in the market have some problems, either the defects in the actual use or the defects in the production process. Therefore, there is an urgent need for a door sill that can meet both the production demands of the enterprises and the demands of the users in the actual use.

OBJECTS AND SUMMARY OF THE INVENTION

In view of the above problems, the present invention discloses a height-adjustable door sill.

The specific technical solution is as follows.

The height-adjustable door sill includes a sill deck and an adjustable rail carrier assembly. The adjustable rail carrier assembly is configured on the sill deck. The rail carrier assembly includes a rail cap, a rail carrier, a flange nut and an adjustment screw. A groove is formed in one side of the sill deck. The groove is configured to match with the rail carrier assembly for the rail carrier to fit in the groove.

A nut installation tunnel is formed in the rail carrier. The rail cap, which is arranged along an extension direction of the rail carrier, removably joins to an upper surface of the rail carrier. The threaded bore is assembled at the nut installation tunnel. The adjustment screw is in threaded fit with the threaded bore. A lower surface of the adjustment screw is pressed against a bottom surface of the groove. The adjustment screw is configured to drive the flange nut to move up or down in an axial direction of the adjustment screw through rotation, thereby altering the height of the rail carrier fitted in the groove and altering the height of the rail cap.

According to the height-adjustable door sill, the rail carrier has an H-shaped cross section. The threaded bore is plugged into the nut installation tunnel. A limiting flange is arranged at a lower end of the flange nut. The limiting flange is provided with a plurality of spikes. The plurality of spikes, which are in interference fit with the rail carrier, are evenly distributed in a circumferential direction and are implanted into the rail carrier.

According to the height-adjustable door sill, at least two nut installation tunnels are formed in the rail carrier. The flange nuts and the adjustment screws are correspondingly assembled in the nut installation tunnels.

According to the height-adjustable door sill, a removal groove is formed in one end of the rail cap, and the other end of the rail cap bends in an L shape in relation to an end surface of the rail cap and extends to form a guard plate. Arms are symmetrically arranged on a lower surface of the rail cap. A recess is formed in an upper end of the rail carrier to form a clamp for fitting with the arms. The rail cap is connected to the rail carrier through snap-in fit of the arms and the clamp.

According to the height-adjustable door sill, screwdriver bit holes are formed in both ends of the adjustment screw for assembly and rotation.

According to the height-adjustable door sill, both ends of the adjustment screw are polygon flange bolt heads.

The present invention has the following beneficial effects.

The height-adjustable door sill disclosed in the present invention is used for keeping door imperviousness. The door sill includes a sill deck and a rail carrier assembly having a function of height adjustment. The rail carrier assembly is configured on the sill deck. The rail carrier assembly includes a rail cap, a rail carrier, a flange nut and an adjustment screw. The rail cap removably joins to an upper end of the rail carrier. A groove is formed in the sill deck for the rail carrier to fit in the groove. A nut installation tunnel is formed in the rail carrier. The threaded bore is assembled at the nut installation tunnel and is in threaded fit with the adjustment screw. The adjustment screw drives the flange nut to move up or down in an axial direction of the adjustment screw through rotation, thereby altering the height of the rail carrier fitted in the groove and altering the height of the rail cap. The present invention is novel in structure and reasonable in design, and effectively overcomes the defects in the existing similar products. With the function of adjusting the clearance between the door panel and the sill of the door frame achieved, the door sill is also developed in the product performance and production process. The door sill is simple and efficient to assemble, and is practical, aesthetic and vapor-proof. The production efficiency of the door sill is effectively improved, and the production cost is controlled, so that the production demands of the enterprises are satisfied.

Figure 1:
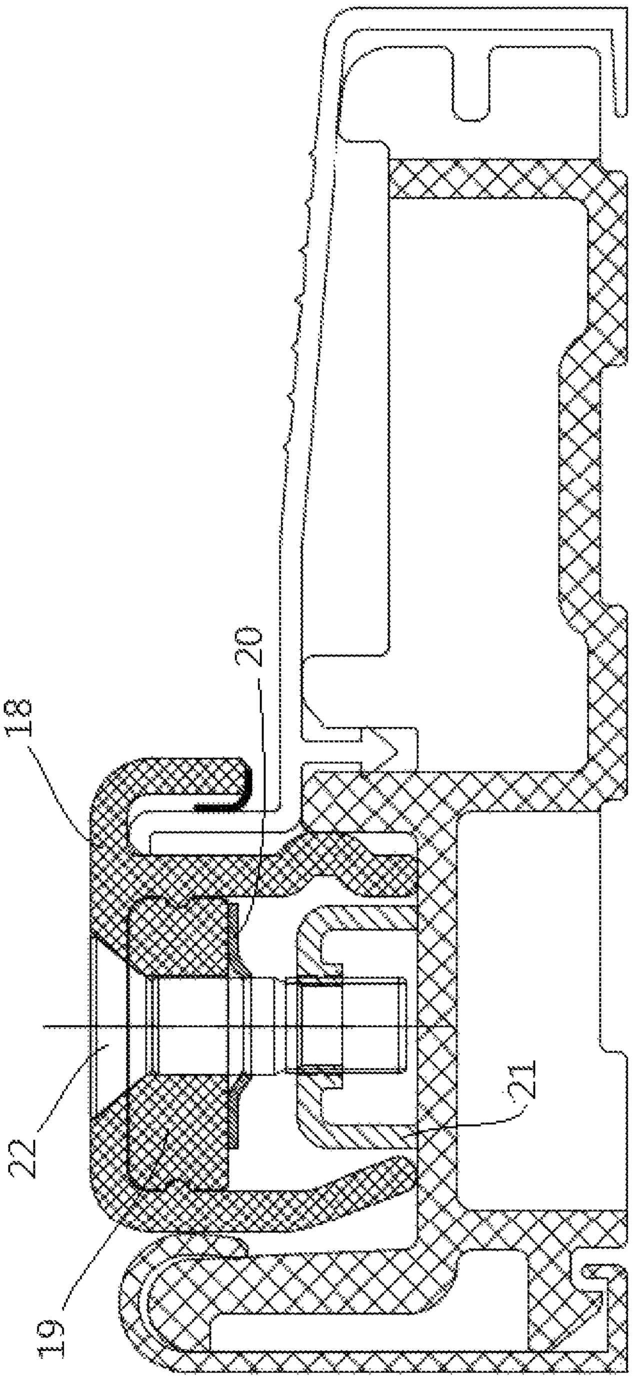
FIG. 1 (Prior Art)
FIG. 1 is a cross section of a door sill I.

Description of reference numerals: 1, sill deck; 2, rail carrier assembly; 3, rail cap; 4, rail carrier; 5, threaded bore; 6, adjustment screw; 7, groove; 8, nut installation tunnel; 9, limiting flange; 10, spike; 11, removal groove; 12, guard plate; 13, arms; 14, clamp; 15, door panel; 16, upper screw head; 17, lower screw head; 18, rail cap I; 19, rail carrier I; 20, retainer clip I; 21, adjustment nut I; 22, adjustment screw I; 23, rail carrier II; 24, retainer clip II; 25, adjustment screw II; 26, sealing strip II; 27, rail cap III; 28, rail carrier III; 29, adjustment screw III; 30, screw cover III; 31, adjustment nut II; 32, adjustment nut III; 33, installation slot; 34, crown staple; 35, rail carrier unit; 36, seal; 37, sealing surface and 38, flange nut.

DETAILED DESCRIPTION OF THE EMBODIMENTS

In order to make the technical solution of the present invention clearer, the present invention will be further described in conjunction with embodiments below. Any solution obtained by equivalent replacement and conventional reasoning of technical features of the technical solution of the present invention shall fall into the protection scope of the present invention.

Embodiment I

Figure 10:
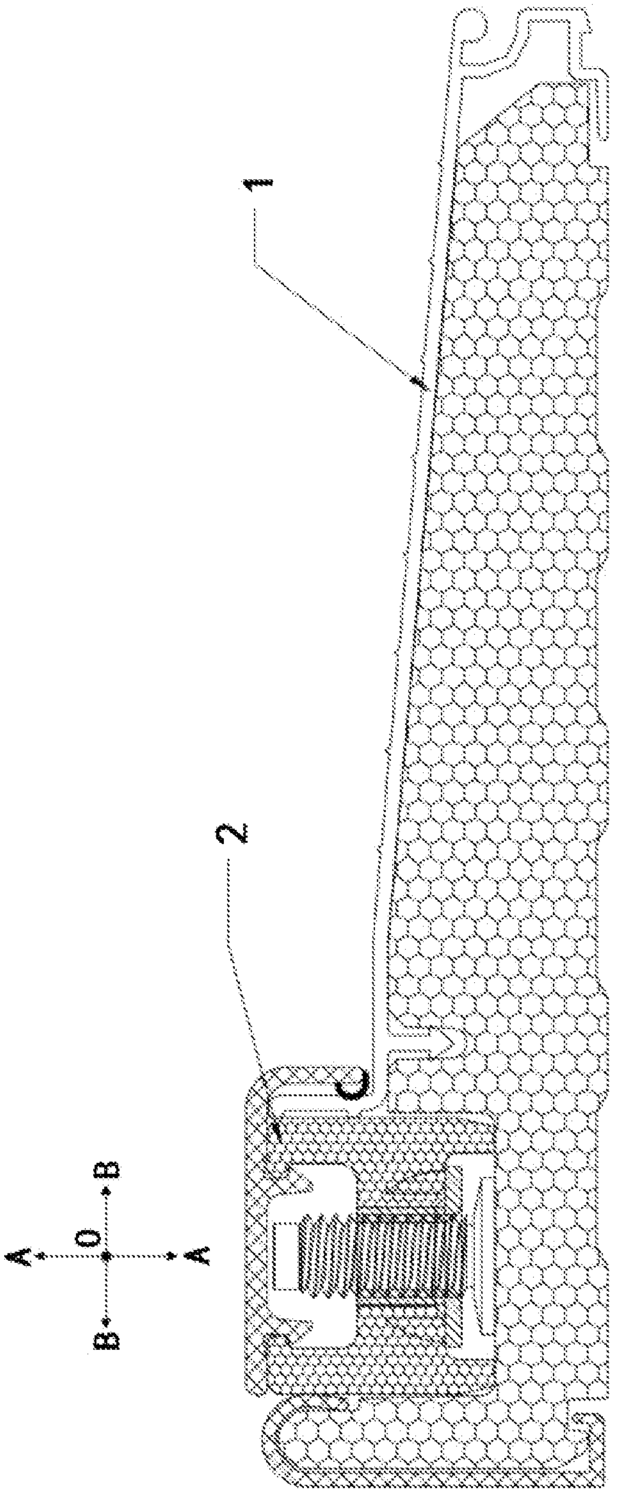
FIG. 10 is a cross section of the present invention (high-position state)

The horizontal direction, vertical direction and left-right direction mentioned in this embodiment and subsequent embodiments are as marked in FIG. 10. The horizontal direction is the direction extending from point O to the inside and outside of FIG. 10, the vertical direction is the direction indicated by A-A and its extension direction (the up-down direction in FIG. 10), and the left-right direction is the direction indicated by B-B and its extension direction (the left-right direction in FIG. 10).

As shown in FIGS. 10-14 and 19, this embodiment discloses a height-adjustable door sill having a function of height adjustment. The door sill is used for adjusting a clearance between a door panel 15 and a sill of a door frame to ensure proper fitting therebetween, thereby keeping door imperviousness. Specifically, the adjustable door sill includes a sill deck 1 and a height-adjustable rail carrier assembly 2. The height-adjustable rail carrier assembly 2 is configured on the sill deck 1. The rail carrier assembly 2 has the function of height adjustment, and includes a rail cap 3, a rail carrier 4, a flange nut 38 and an adjustment screw 6. A groove 7, which is adapted to and matched with the rail carrier assembly 2, is formed at one side, abutting the door frame, of the sill deck 1. The rail carrier 4 fits in the groove 7. The lengths of the rail carrier 4 and the groove 7 are adapted to the specifications of the door panel 15 and the door frame. Specifically, the horizontal lengths of the rail carrier 4 and the groove 7 are adapted to the widths of the door panel 15 and the door frame.

Figure 19:
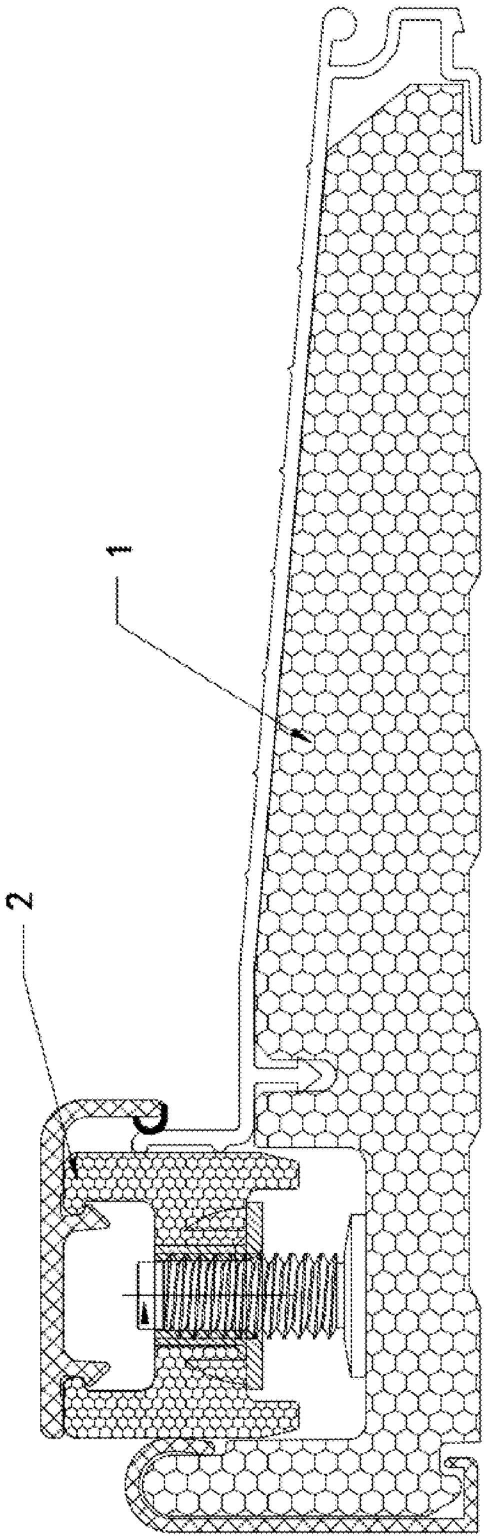
FIG. 19 is a cross section of the present invention (high-position state)

In order to achieve the function of height adjustment of the rail carrier assembly 2, in this embodiment, the rail carrier 4 extends along the horizontal direction, and a nut installation tunnel 8 is formed in the rail carrier 4. A threaded bore 5 is assembled at the nut installation tunnel 8, and the adjustment screw 6 is in threaded fit with the threaded bore 5. A lower surface of the adjustment screw 6 is pressed against a bottom surface of the groove 7. The rail cap 3, which is arranged along an extension direction of the rail carrier 4, removably joins to an upper surface of the rail carrier 4. When the adjustment screw 6 is rotated, the-flange nut 38 moves up or down along an axial direction of the adjustment screw 6 (i.e., the vertical direction), thereby altering the height of the rail carrier 4 fitted in the groove 7 and altering the height of the rail cap 3. In this way, the clearance between the door panel 15 and the sill of the door frame is adjusted (as shown in FIGS. 10 and 19).

Embodiment II

This embodiment discloses a height-adjustable door sill in which the rail carrier 4 fitted in the groove 7 may extend continuously along a horizontal direction across the groove 7 or be of a segmented type.

Figure 21:
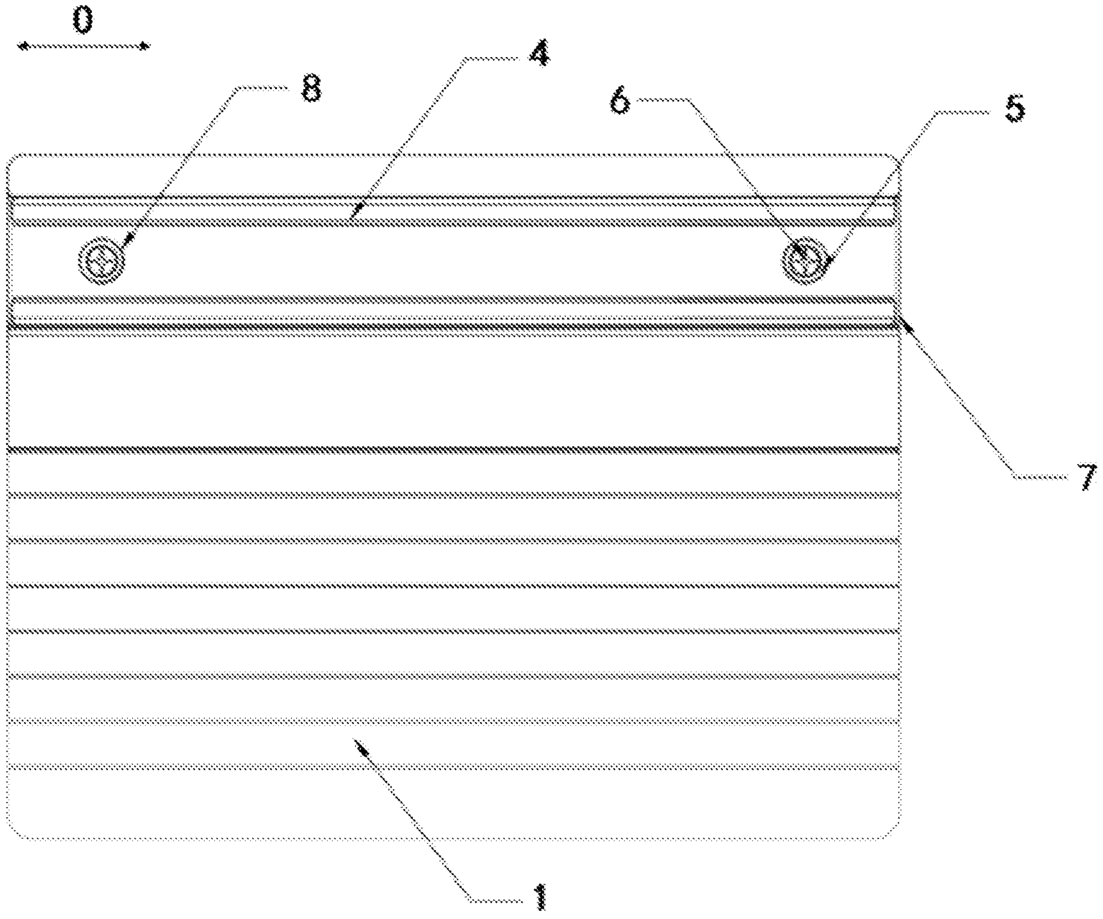
FIG. 21 is a top view of the present invention (with the rail cap omitted, the rail carrier extends continuously along a horizontal direction across the groove)

As shown in FIG. 21, at least two nut installation tunnels 8 are formed in the one-piece rail carrier 4, and the flange nuts 38 and the adjustment screws 6 are correspondingly assembled in the nut installation tunnels 8. When the rail carrier 4 includes exactly two nut installation tunnels 8, the two nut installation tunnels 8 are symmetrically arranged at both ends of the rail carrier 4 along the horizontal direction (the left-right direction as shown in FIG. 21). When the rail carrier 4 includes more than two nut installation tunnels 8, a pair of the nut installation tunnels 8 are symmetrically arranged at both ends of the rail carrier 4 along the horizontal direction, and the other nut installation tunnels 8 are arranged between the pair of the nut installation tunnels 8 at intervals.

Figure 22:
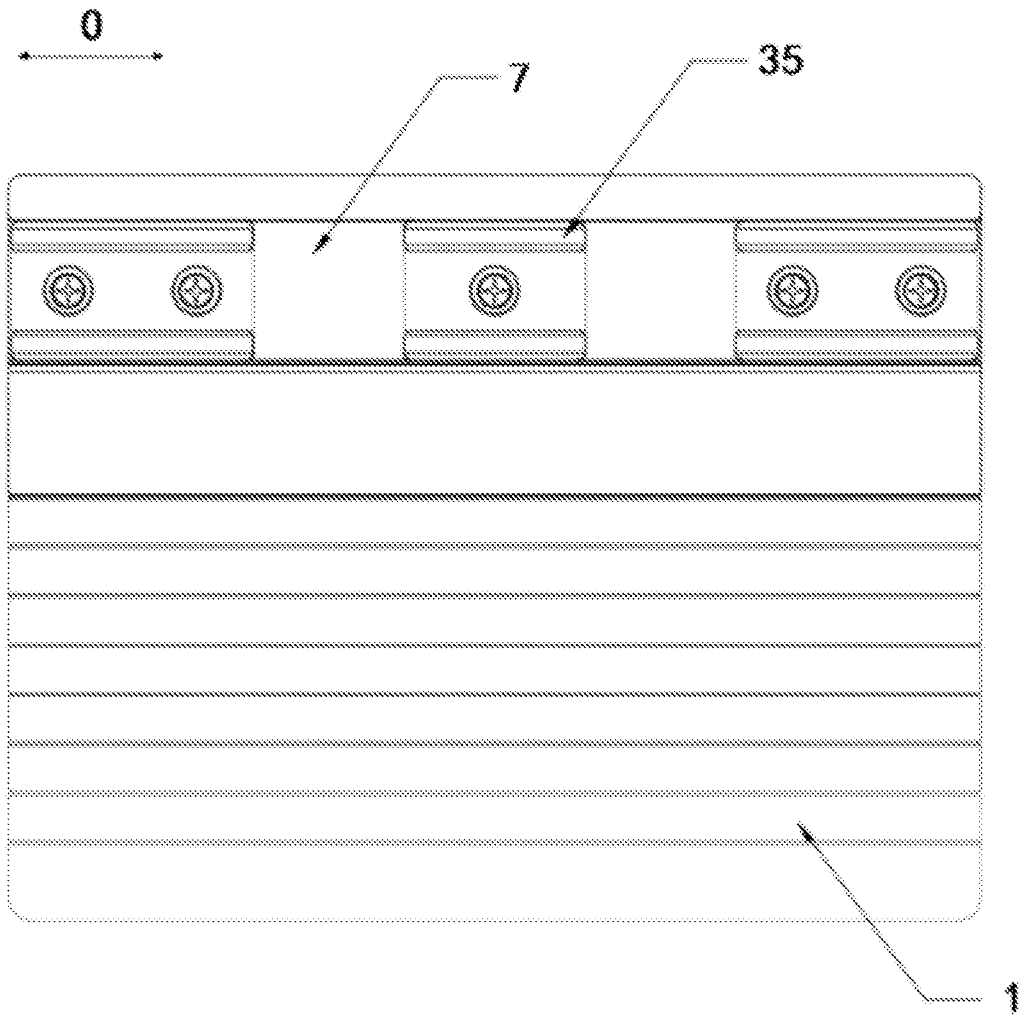
FIG. 22 is a top view of the present invention (with the rail cap omitted, the rail carrier is of a segmented type)

As shown in FIG. 22, the segmented rail carrier 4 includes at least two rail carrier units 35. The rail carrier units 35 are arranged at intervals along the horizontal direction of the groove 7 (the left-right direction shown in FIG. 22). A nut installation tunnel 8 is formed in the rail carrier unit 35, and the flange nut 38 and the adjustment screw 6 are correspondingly assembled in the nut installation tunnel 8. When the rail carrier 4 includes exactly two rail carrier units 35, the two rail carrier units 35 are symmetrically arranged at both ends of the groove 7 along the horizontal direction (the left-right direction as shown in FIG. 22). When the rail carrier 4 includes more than two rail carrier units 35, a pair of the rail carrier units 35 are symmetrically arranged at both ends of the groove 7 along the horizontal direction, and the other rail carrier units 35 are arranged at intervals between the pair of the rail carrier units 35. In an embodiment, the cross section of each of the rail carrier units 35 is H-shaped. In another embodiment, the pair of rail carrier units 35 at both ends of the groove 7 is H-shaped. But the cross section of the other rail carrier units 35 may be H-shaped or not.

Based on the solution of this embodiment, the comparison between the one-piece rail carrier 4 and the segmented rail carrier 4 shows that, the one-piece rail carrier 4 can effectively ensure the stability and the supportability of the door sill, but the cost is higher as more material is used; and the segmented rail carrier 4 needs to be installed according to the supporting points of the door sill, and such a configuration may affect the stability and supportability of the door sill, but reduce the use of material, thereby reducing the cost. The users may make their choices according to the usage scenario of the door sill.

Embodiment III

As shown in FIGS. 10, 11 and 13-16, this embodiment discloses a height-adjustable door sill in which the rail carrier 4 is improved. In an embodiment, the rail carrier 4 has an H-shaped cross section. The H-shaped rail carrier 4 shows on its cross section a vertical pair of legs and a bar extending horizontally to connect the pair of legs. In an embodiment, a lower portion of the rail carrier 4 always remains in the groove 7 despite the rail carrier 4 is elevated to its highest position for best stability. In another embodiment, the pair of legs which are below the bar remain in the groove 7 despite the rail carrier 4 is elevated to its highest position. In yet another embodiment, a lower portion of the horizontal bar remains in the groove 7 despite the rail carrier 4 is elevated to its highest position. In an embodiment, the pair of legs stand on the bottom surface of the groove 7 when the rail carrier 4 is dropped to its lowest position.

The upper surface of the rail carrier 4 is recessed in the middle to form an installation slot 33. The nut installation tunnel 8 runs through the rail carrier 4 and communicates with the installation slot 33. To facilitate the automatic assembly, the-threaded bore 5 is plugged into the nut installation tunnel 8 and is press-fitted with the rail carrier 4. The upper end of the adjustment screw 6, which is in threaded fit with the threaded bore 5, extends into the installation slot 33.

As shown in FIG. 10, the left and right sides of the rail carrier 4 are in clearance fit with left and right inner walls of the groove 7, respectively, so that the stability of the rail carrier 4 is effectively ensured, and the rail carrier 4 is prevented from swaying in the groove 7.

Figure 23:
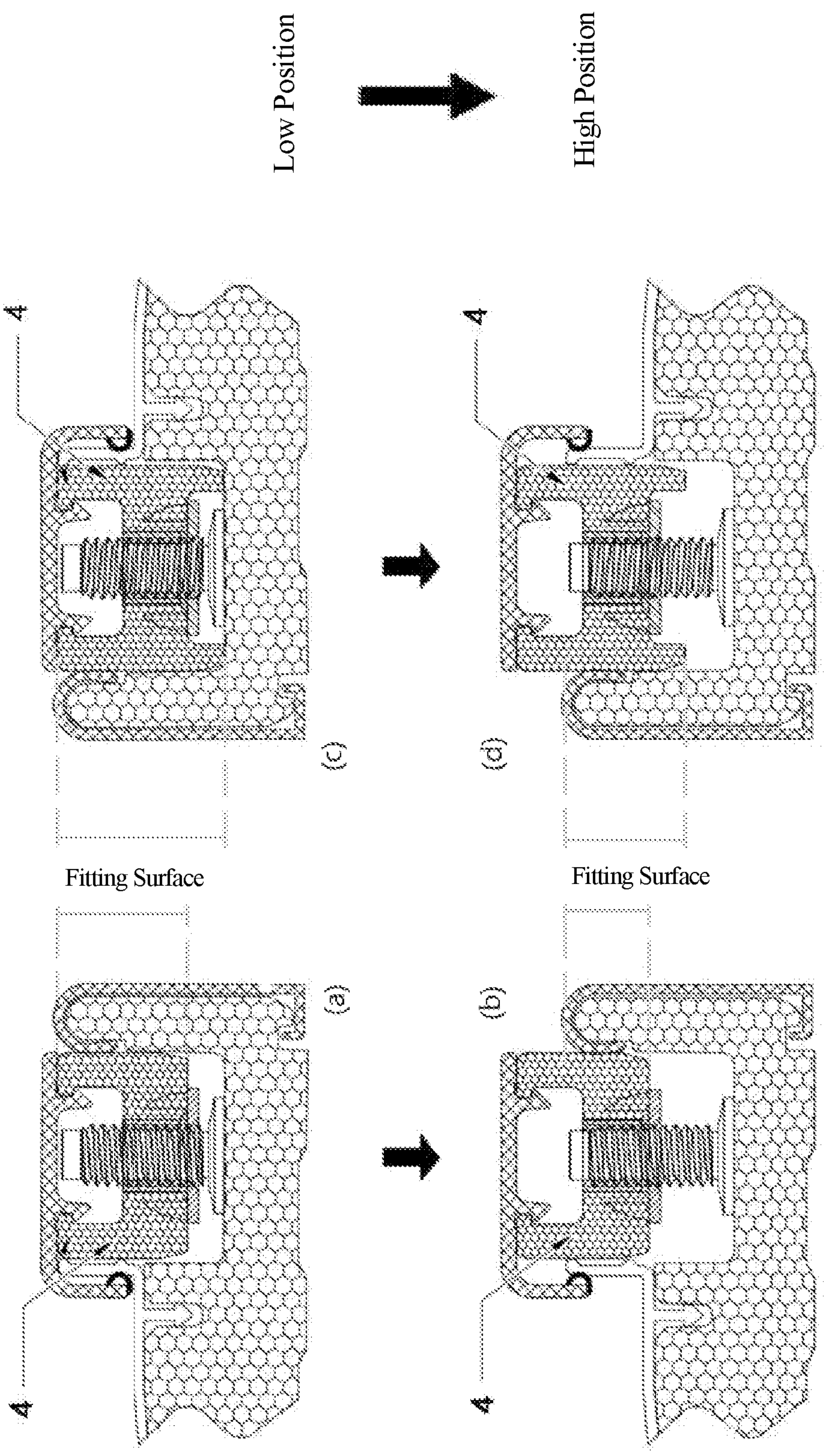
FIG. 23 is a comparison diagram showing the change of a fitting surface in Embodiment III.

In addition, the installation of the adjustment screw 6 may lead to a clearance between the lower surface of the rail carrier 4 and the bottom of the groove 7. In the process of adjusting the height of the door sill, the surfaces of the left and right sides of the rail carrier 4 fitting the left and right inner walls of the groove 7 (hereinafter referred to as fitting surfaces) may decrease as the height of the rail carrier 4 (the height in the vertical direction) increases, and such a decrease may affect the stability of the rail carrier 4. In view of the problem, in this embodiment, the two sides of the lower surface of the rail carrier 4 extend downward symmetrically to form an H-shaped cross section of the rail carrier 4. In this way, for the door sills with the same specifications, the fitting surfaces of the rail carrier 4 having the lower surface whose two sides extend downward symmetrically (as shown in FIG. 23(*c*), (*d*)) are larger than the fitting surfaces of the rail carrier 4 having the lower surface whose two sides do no extend downward (as shown in FIG. 23(*a*), (*b*)). Therefore, the use of the rail carrier 4 having the H-shaped cross section improves the stability of the rail carrier itself and the door sill.

In order to stabilize the flange nut 38 and the rail carrier 4 at the installation positions and improve the installation strength of the adjustment nut and the rail carrier, this embodiment makes the following improvements to the flange nut 38. Firstly, a limiting flange 9, which has an outer diameter greater than the inner diameter of the nut installation tunnel 8, is arranged at a lower end of the flange nut 38, and is used to determine the press-fit limiting position of the flange nut 38, thereby ensuring the installation positions of the flange nut 38 and the rail carrier 4. Secondly, the limiting flange 9 is provided with a plurality of spikes 10, and the plurality of spikes 10 are evenly distributed along a circumferential direction. After the flange nut 38 is press-fitted, the spikes 10 on the flange nut, which are in interference fit with the rail carrier 4, are implanted into the rail carrier 4, thereby ensuring the installation strength of the flange nut 38 and the rail carrier 4.

In addition, the rail carrier 4 is made by molding of crust foam plastic, so that the weight of the door sill is light while the use strength is ensured, the production cost is controlled, and the feasibility of press-fitting of the flange nut 38 and implantation of the spikes 10 is also ensured.

Embodiment IV

Figure 15:
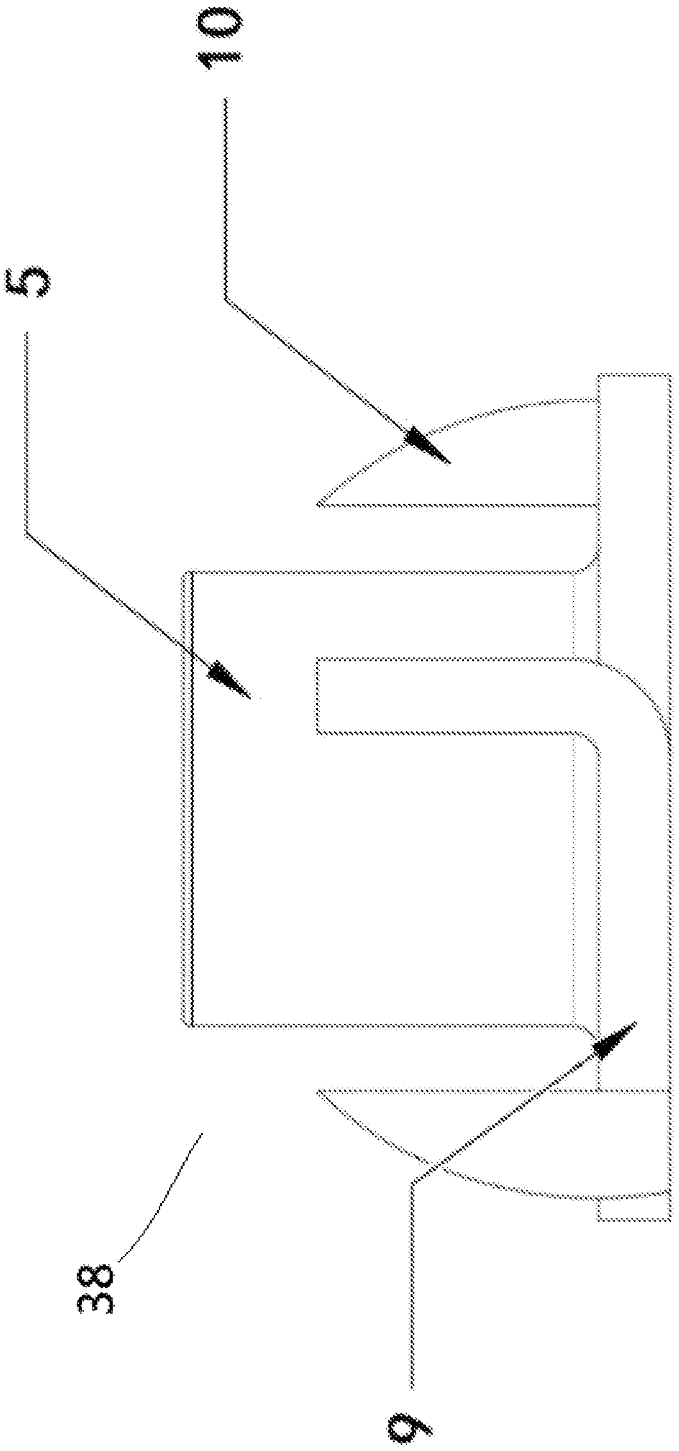
FIG. 15 is a front view of a flange nut.
Figure 16:
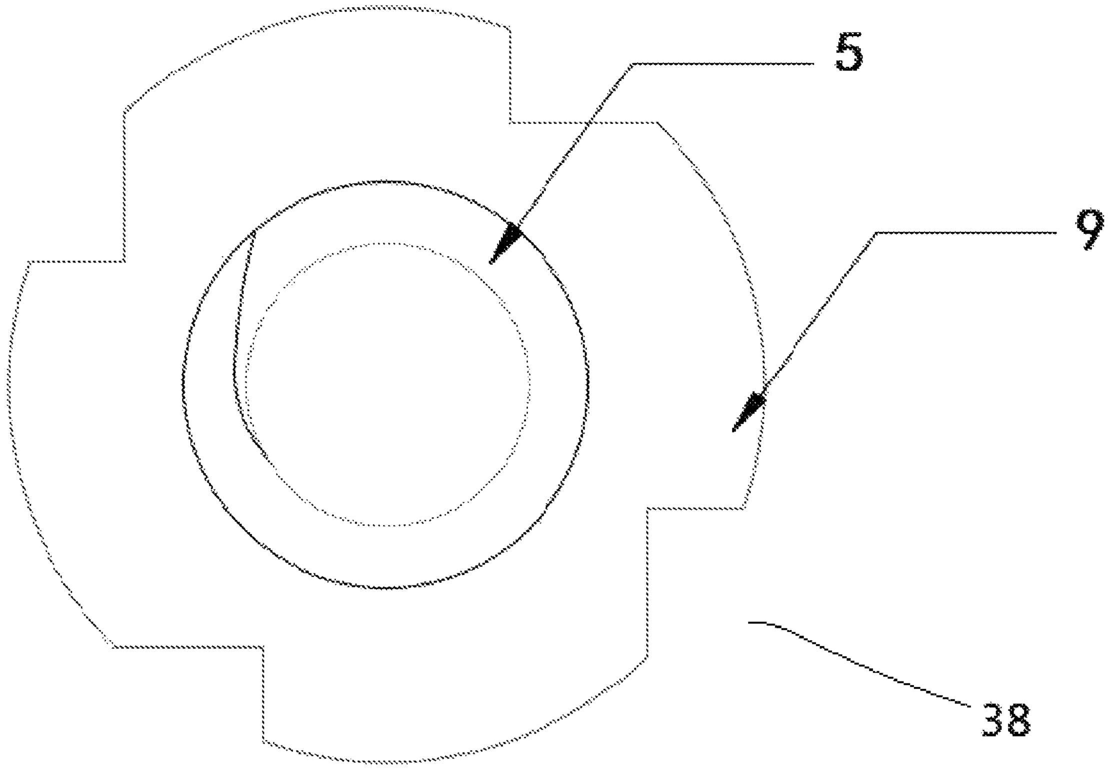
FIG. 16 is a bottom view of a flange nut.

As shown in FIGS. 15 and 16, this embodiment discloses a height-adjustable door sill in which the spikes 10 and the limiting flange 9 form an integrated structure. The spikes 10 are obtained by cold-pressing the edge of the limiting flange 9, so that the processing is less difficult. Of course, the spikes 10 and the limiting flange 9 may also be connected by welding.

In such cases, the threaded bore 5, the limiting flange 9 and the spikes 10 are preferably made of metal materials, and if the requirement for the structural strength is not high, may also be made of high-strength plastics, by melting and integrated molding.

Embodiment V

As shown in FIGS. 10, 11, 17 and 24, this embodiment discloses a height-adjustable door sill in which the rail cap 3 is improved. Specifically, the upper surface of the rail cap 3—which is seamless without any perforation or slot—is impervious to dirt or liquids. Compared with the door sill I, the door sill II and the door sill III, the door sill according to our invention has the advantage of imperviousness.

Since the rail cap 3 is a seamless object impervious to dirt or liquids, in order to ensure the function of height adjustment of the door sill to work normally, this embodiment makes other improvements to the rail cap 3. Specifically, in this embodiment, arms 13 are symmetrically arranged on a lower end of the rail cap 3, and a clamp 14 for fitting with the arms 13 is arranged at an upper end of the rail carrier 4. When the rail cap 3 is to be installed, the arms 13 correspondingly engage the clamp 14. The arms 13 and the clamp 14 fitted with each other also function to prevent leakage.

Figure 17:
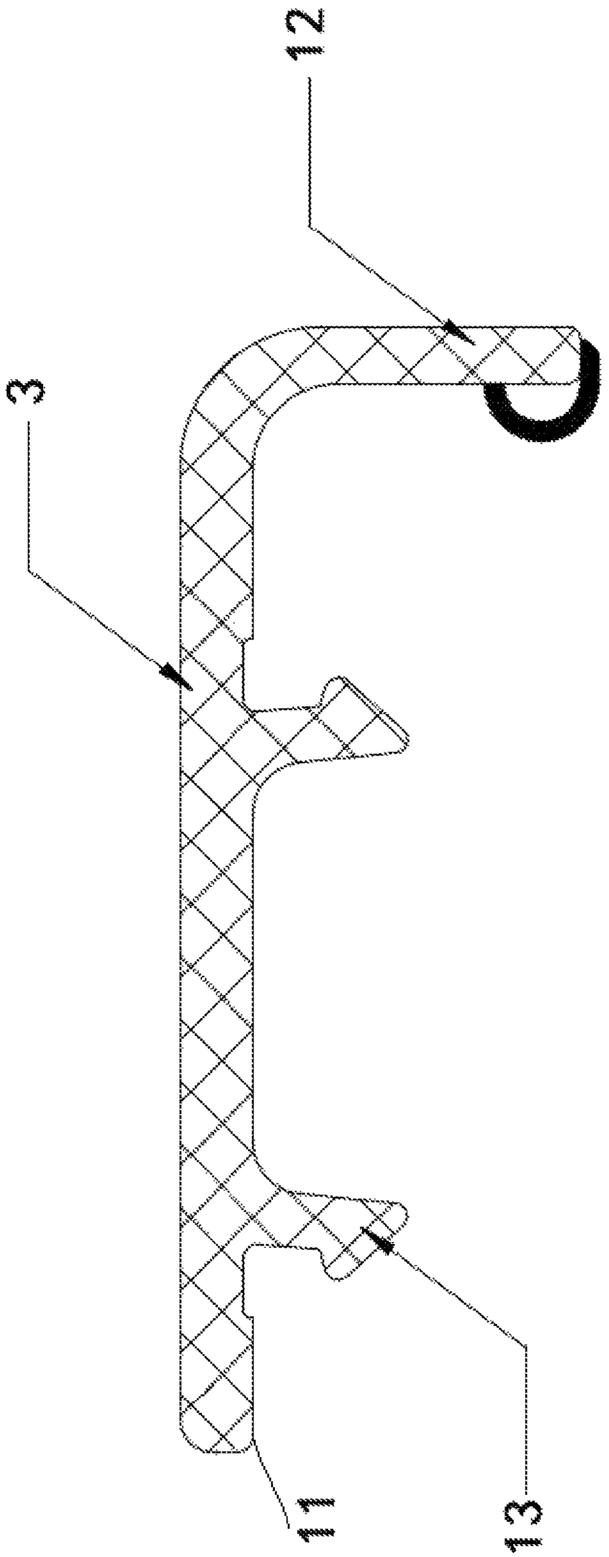
FIG. 17 is a cross section of a rail cap.
Figure 18:
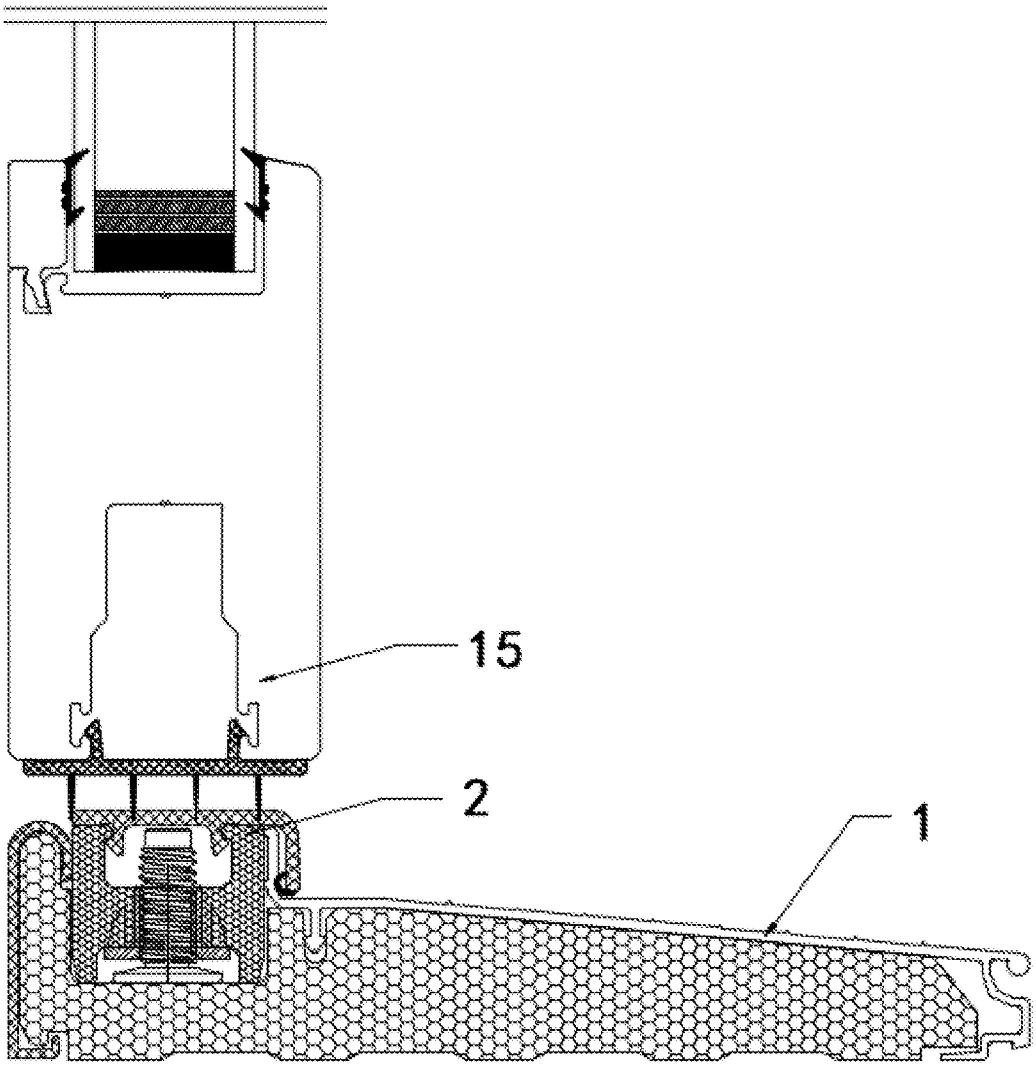
FIG. 18 is a schematic diagram showing the positional relationship between the present invention and a door panel (cross section)
Figure 24:
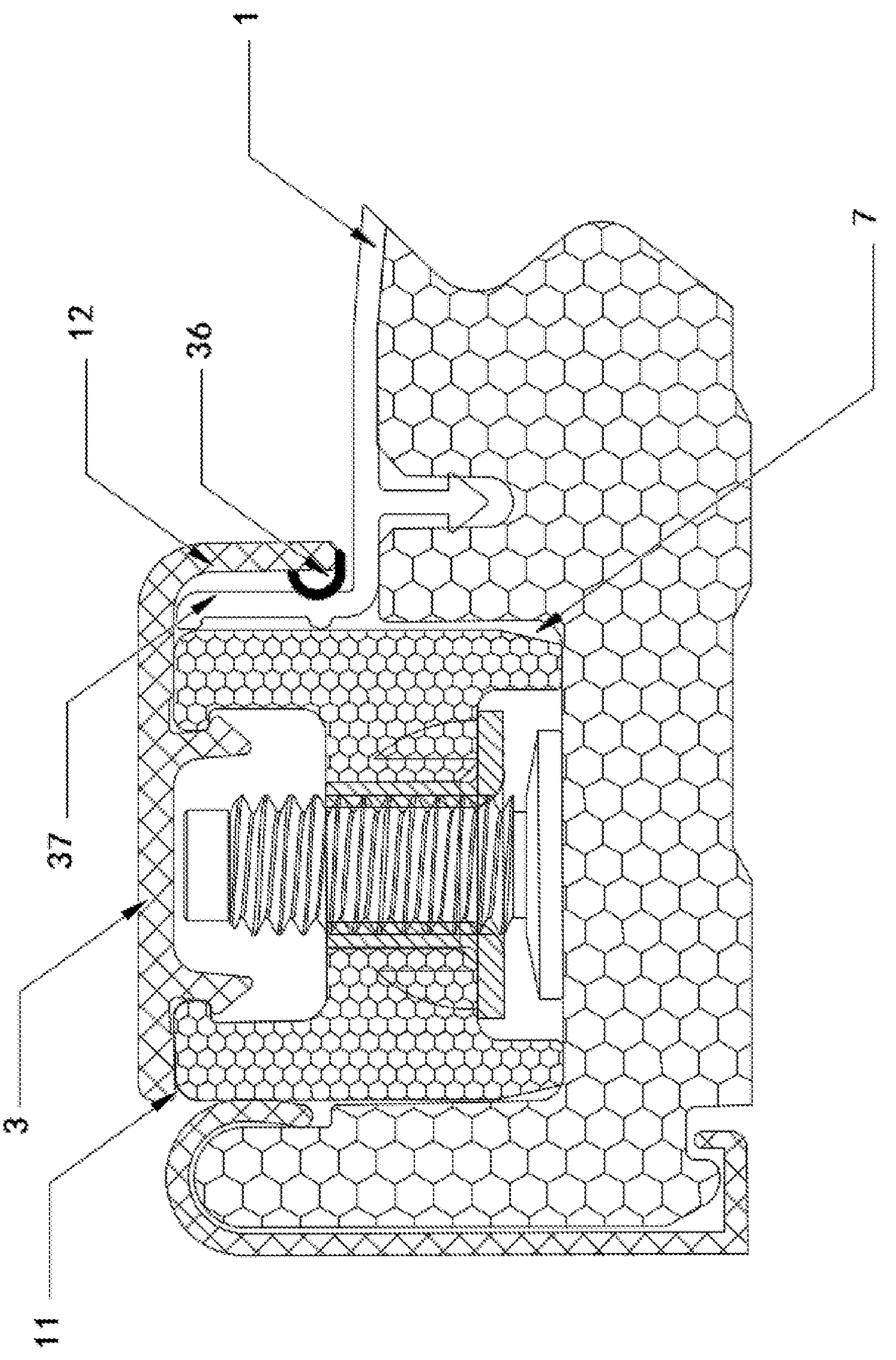
FIG. 24 is a schematic diagram of the rail cap, the sill deck and the rail carrier in a fitted state.

Besides, as shown in FIG. 17, in this embodiment, a guard plate 12 is arranged at the right end of the rail cap 3. The guard plate 12 bends and extends in an L shape in relation to an end surface of the rail cap 3. The guard plate 12 is a seamless object impervious to dirt or liquids, without being perforated or slotted, and therefore has a dustproof function, and may be additionally provided with a seal 36, such as a sealing ring, a sealing strip or the like. As shown in FIG. 24, the added seal 36 on the guard plate 12 fits closely to a sealing surface 37 at an upper edge of the sill deck 1, so that the dustproof function is improved. The sealing surface 37 is an outer surface of an upper part of the groove 7 and also is an outer surface on the right side of the upper part of the groove 7 (as shown in FIG. 24). A removal groove 11 for opening of the rail cap 3 is formed at the left end of the rail cap 3, so that the rail cap 3 can be opened easily when height adjustment, maintenance or cleaning needs to be performed. The rail cap (3), which spans from the removal groove (11) to the guard plate (12), is a seamless object impervious to dirt or liquids, without being perforated or slotted, so that the dustproof function is ensured. In an embodiment, the seal (36) remains in contact with the sealing surface (37) despite the rail carrier (4) is elevated to its highest position.

Compared with the door sill I and the door sill II, this embodiment has better leakproof function and is more aesthetic, and also facilitates the subsequent maintenance of the door sill. In terms of the door sill III, when the height of the door sill III is to be adjusted, it is required to remove the screw covers III 30 one by one before rotating the adjustment screw III 29 for height adjustment. After the height adjustment is completed, it is required to install the screw covers III 30 back one by one. Also, the screw covers III 30 are small in size and lost easily. Moreover, the screw covers III 30 are easily damaged if a large force is applied to open the screw covers III. In contrast, in this embodiment, the rail cap 3 is convenient to open and install, and it is also convenient to adjust the height.

Embodiment VI

Figure 11:
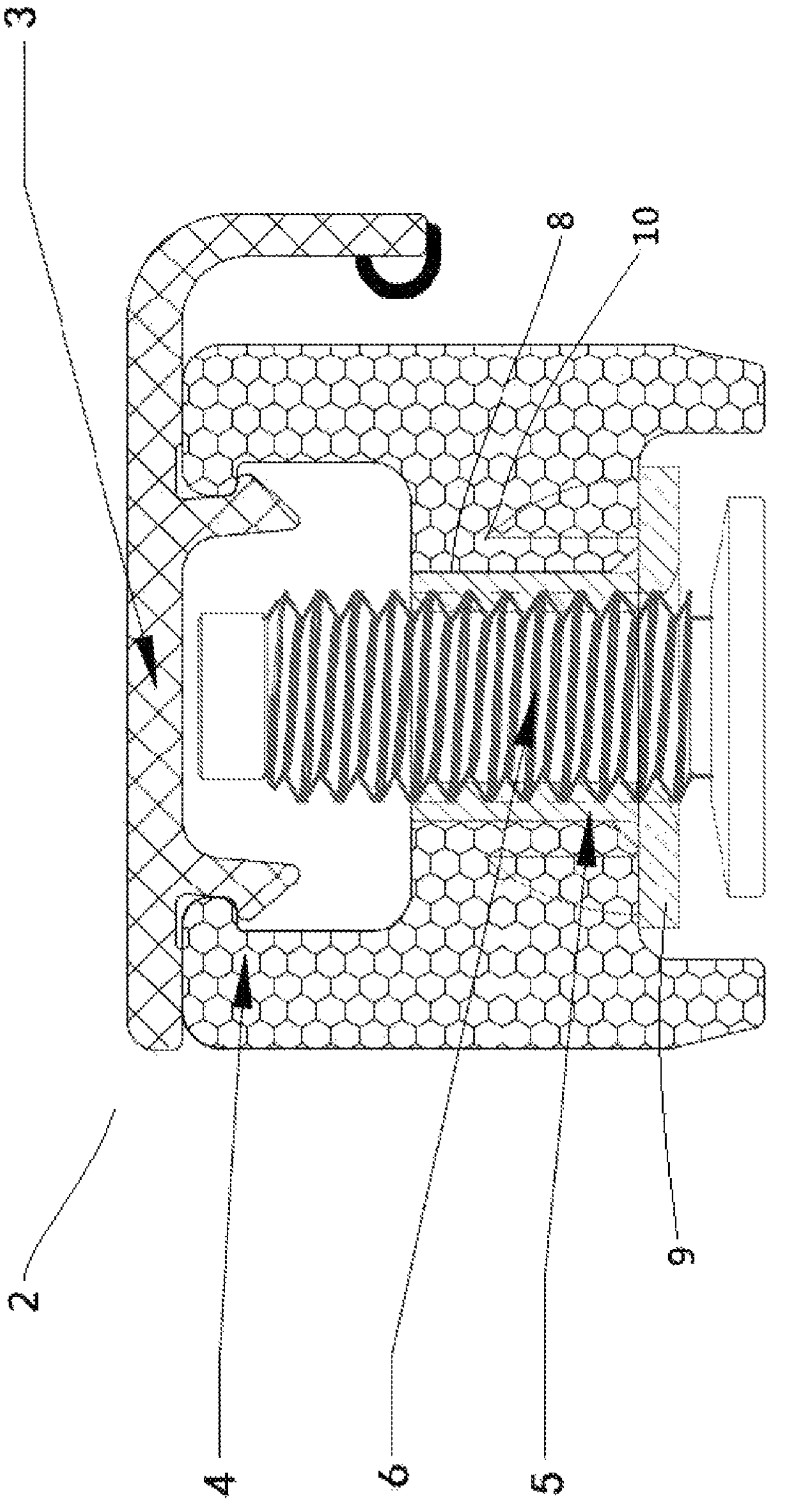
FIG. 11 is a cross section of a rail carrier assembly.
Figure 12:
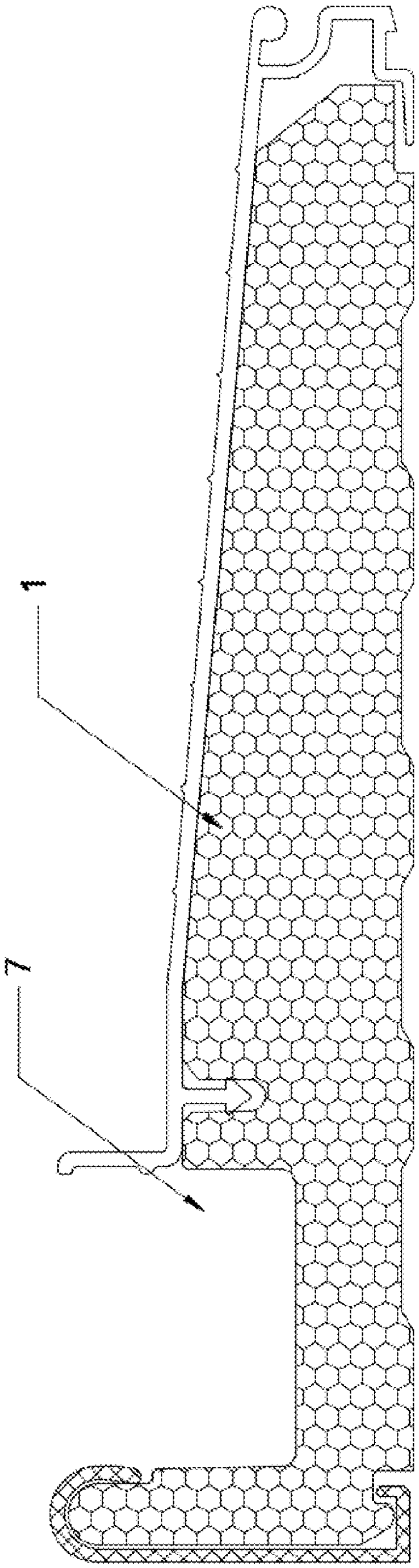
FIG. 12 is a cross section of a sill deck.
Figure 13:
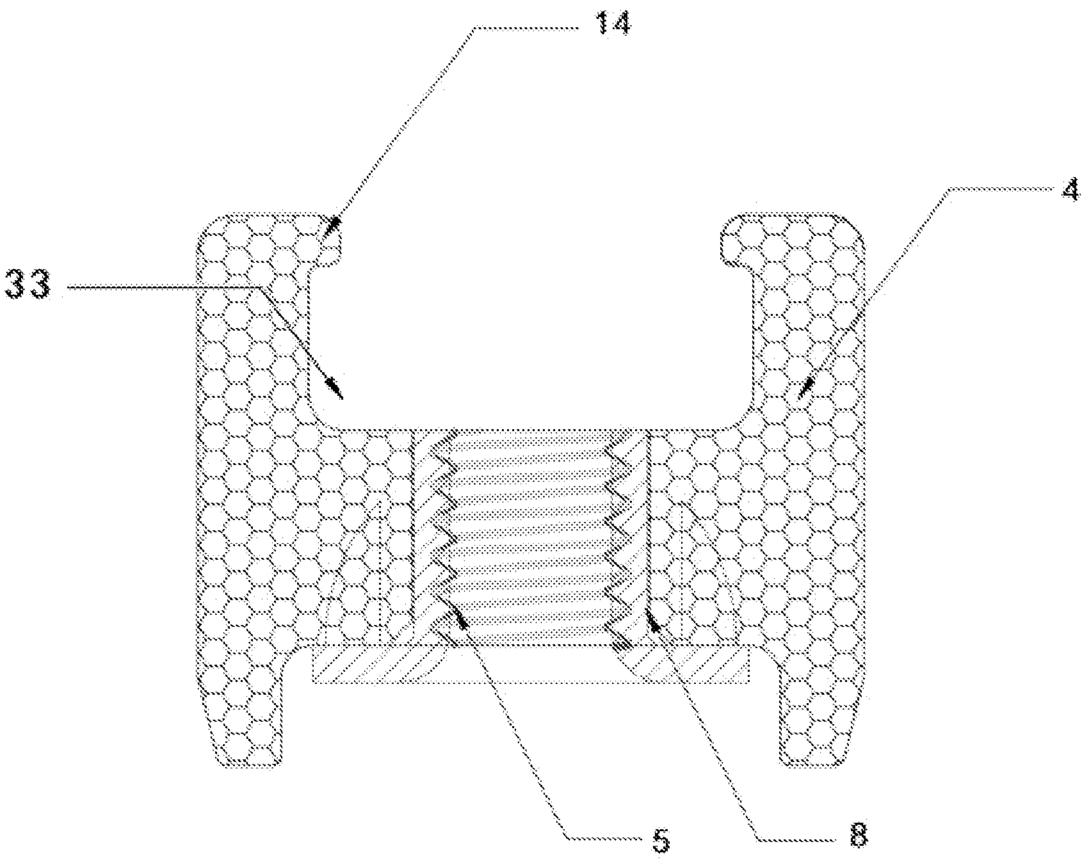
FIG. 13 is a cross section of a rail carrier and a flange nut in a connected state.
Figure 14:
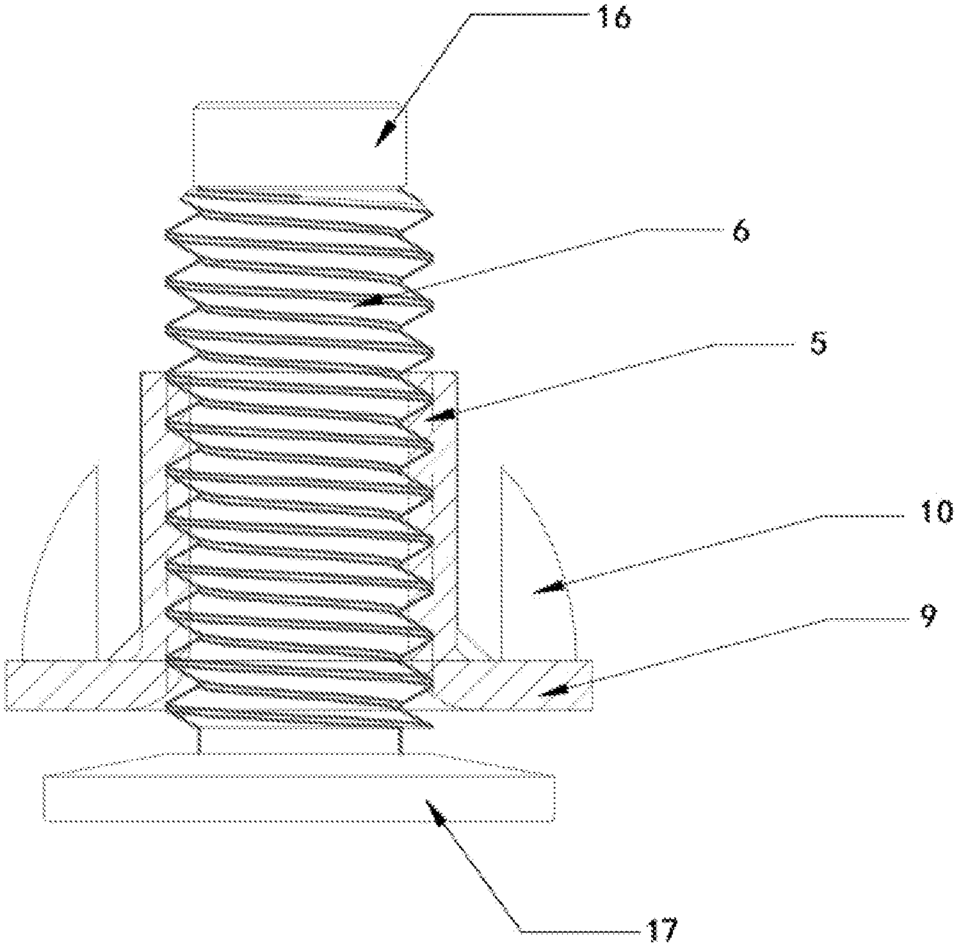
FIG. 14 is a cross section of a flange nut and an adjustment screw in a connected state.

As shown in FIGS. 10, 11 and 14, this embodiment discloses a height-adjustable door sill in which the adjustment screw 6 is also improved. The two ends of the adjustment screw 6 are an upper screw head 16 and a lower screw head 17, respectively. The upper screw head 16, with a smaller size, has an outer diameter equal to the diameter of the adjustment screw 6, and the lower screw head 17, with a larger size, has an outer diameter greater than the diameter of the adjustment screw 6. This embodiment has the following characteristics. Firstly, it is required to assemble the adjustment screw 6 from the bottom of the rail carrier 4, so that the upper screw head 16 will not prevent the threaded fit between the adjustment screw 6 and the adjustment nut 5. Moreover, in the actual use, the lower screw head 17 may limit the upward travel of the adjustment screw 6, thereby preventing the adjustment screw 6 from being loosened and lost. Secondly, the contact area between the lower screw head 17 and the groove 7 is increased, so that the intensity of pressure is reduced, and the stability of the rail carrier 4 in up-down movement is improved.

In addition, in order to facilitates the assembly of the adjustment screw 6 and the up-down movement of the rail carrier 4, the upper screw head 16 and the lower screw head 17 at the two ends of the adjustment screw 6 are processed in this embodiment. Screwdriver bit holes (such as slotted holes, Phillips holes or polygon socket holes) are formed in end surfaces of the upper screw head 16 and the lower screw head 17, or the upper screw head 16 and the lower screw head 17 are processed into polygon flange bolt heads (such as hexagon flange bolt heads). Of course, in order to prevent tampering or thievery, the upper screw head and the lower screw head may also be provided with special-shaped holes or processed into special-shaped bolt heads, and a corresponding adjustment tool should be provided.

Embodiment VII

Based on Embodiment I to Embodiment VI, the height-adjustable door sill of the present invention has been described in detail in terms of the functional features and advantages brought about by its structural features. The advantages of the present invention in terms of the assembly and production process will be described below in conjunction with the existing similar products (e.g., the door sill I, the door sill II and the door sill III described in the BACKGROUND OF THE INVENTION).

Figure 20:
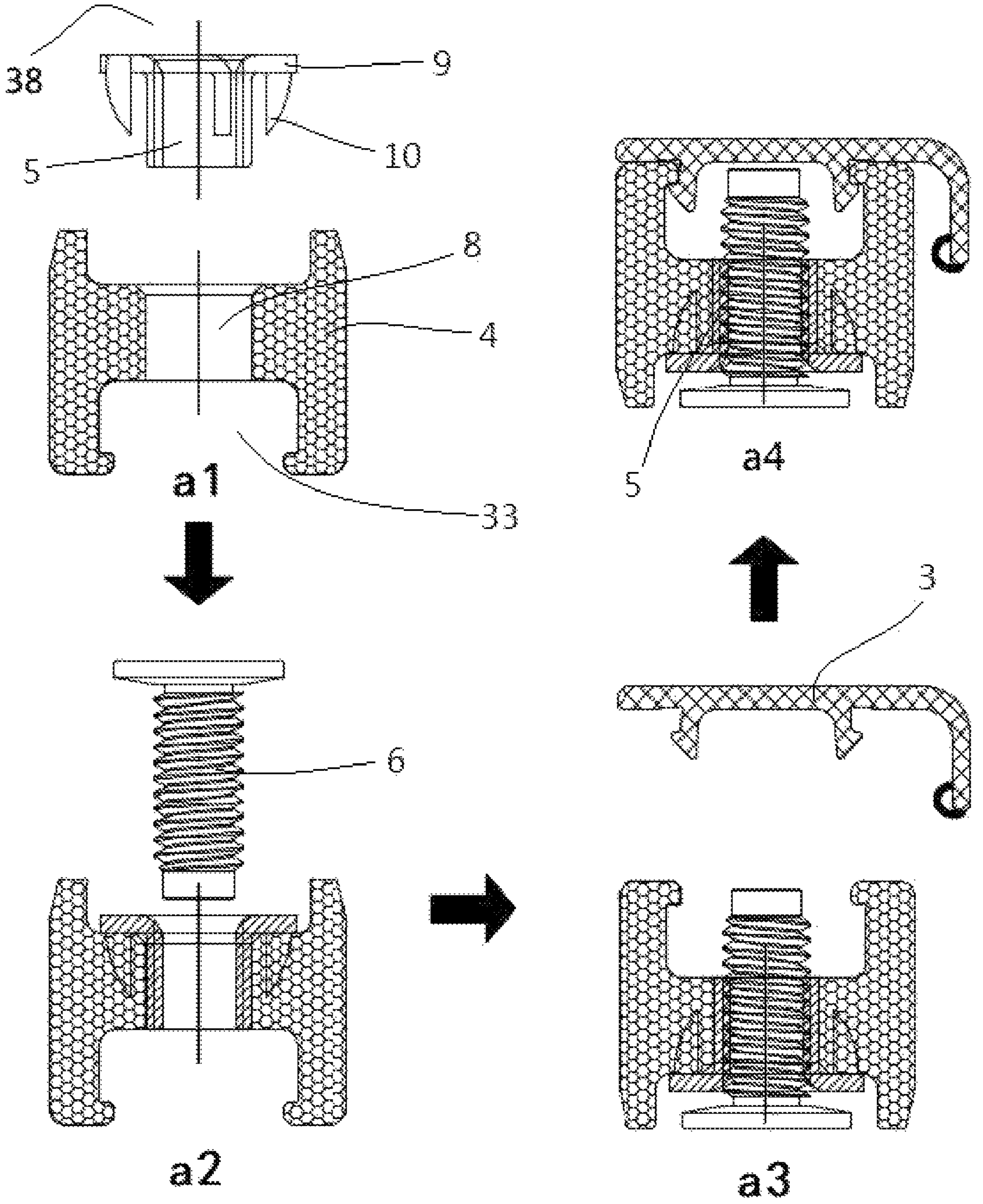
FIG. 20 is a schematic diagram of an assembly process of the rail carrier assembly of the present invention.

The rail carrier assembly 2 in the adjustable door sill of the present invention will be described. As shown in FIG. 20, the assembly process of the rail carrier assembly specifically includes the following three steps:

a1, press fit: the flange nut 38 is press-fitted into the rail carrier 4 to form a whole;

a2, screw-in of screw: the adjustment screw 6 is screwed into the threaded bore 5; and a3, installation of rail cap: the rail cap 3 joins to the upper end of the rail carrier 4.

In this way, the assembly of the rail carrier assembly 2 of the present invention is completed (as shown in a4 of FIG. 20).

Figure 2:
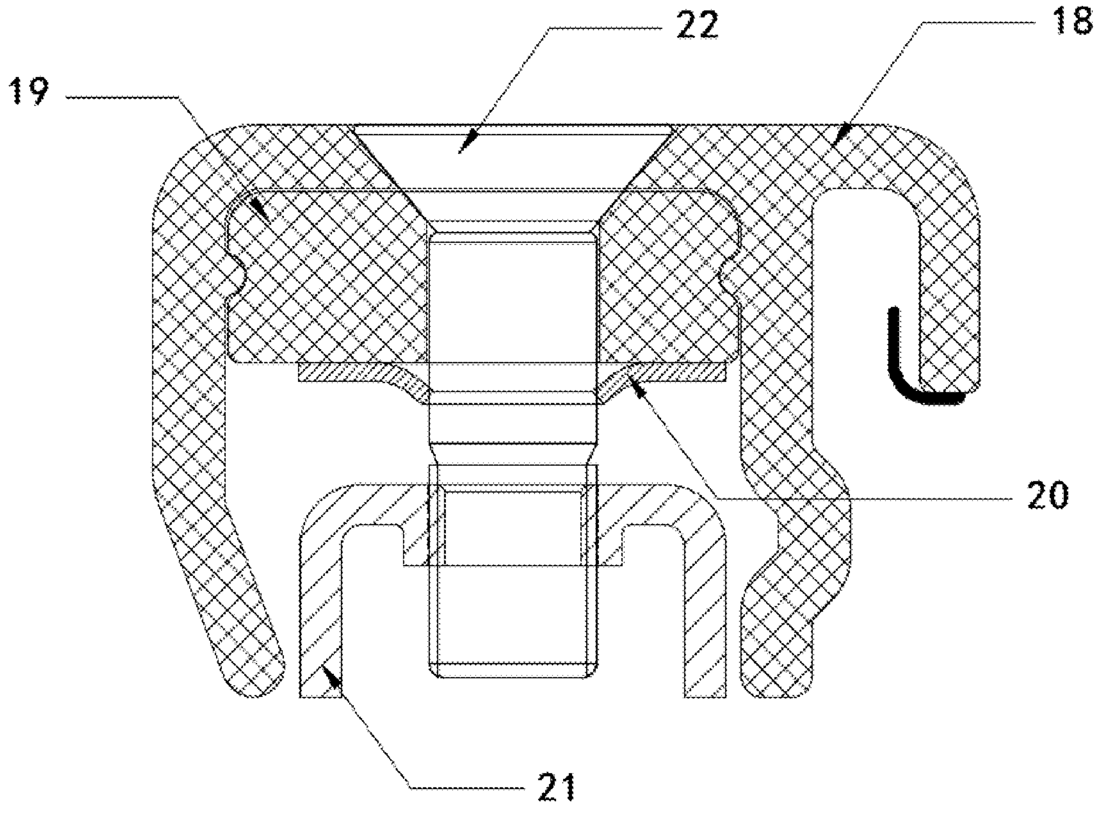
FIG. 2 (Prior Art)
FIG. 2 is a cross section of a rail carrier assembly of the door sill I.
Figure 3:
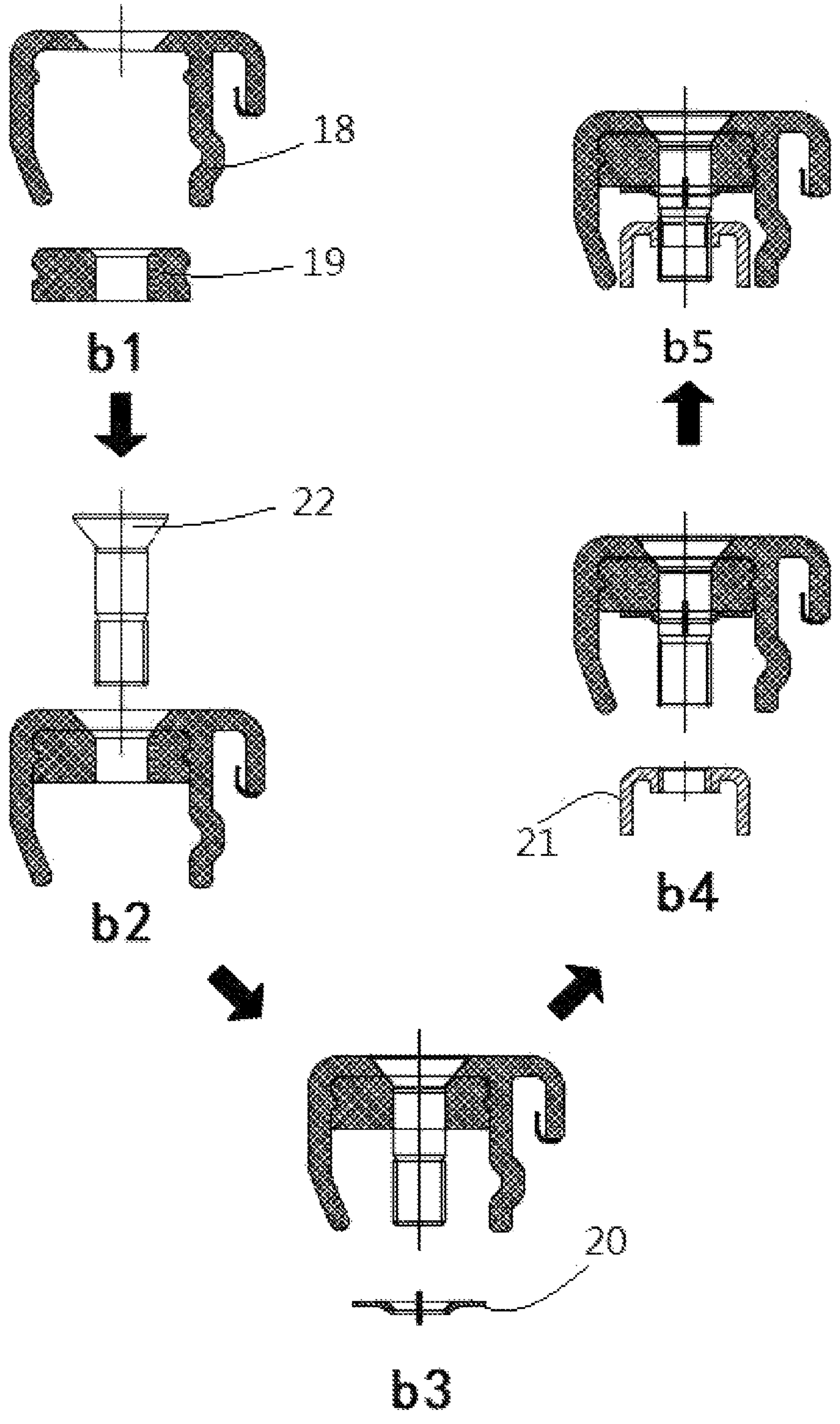
FIG. 3 (Prior Art)
FIG. 3 is a schematic diagram of an assembly process of the rail carrier assembly of the door sill I.
Figure 4:
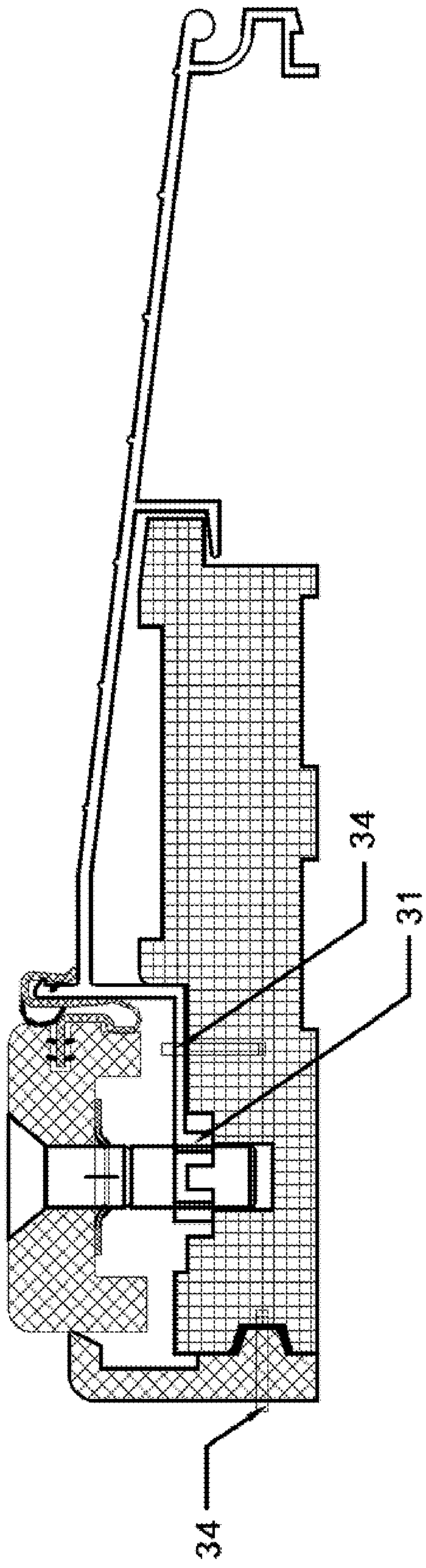
FIG. 4 (Prior Art)
FIG. 4 is a cross section of a door sill II.
Figure 5:
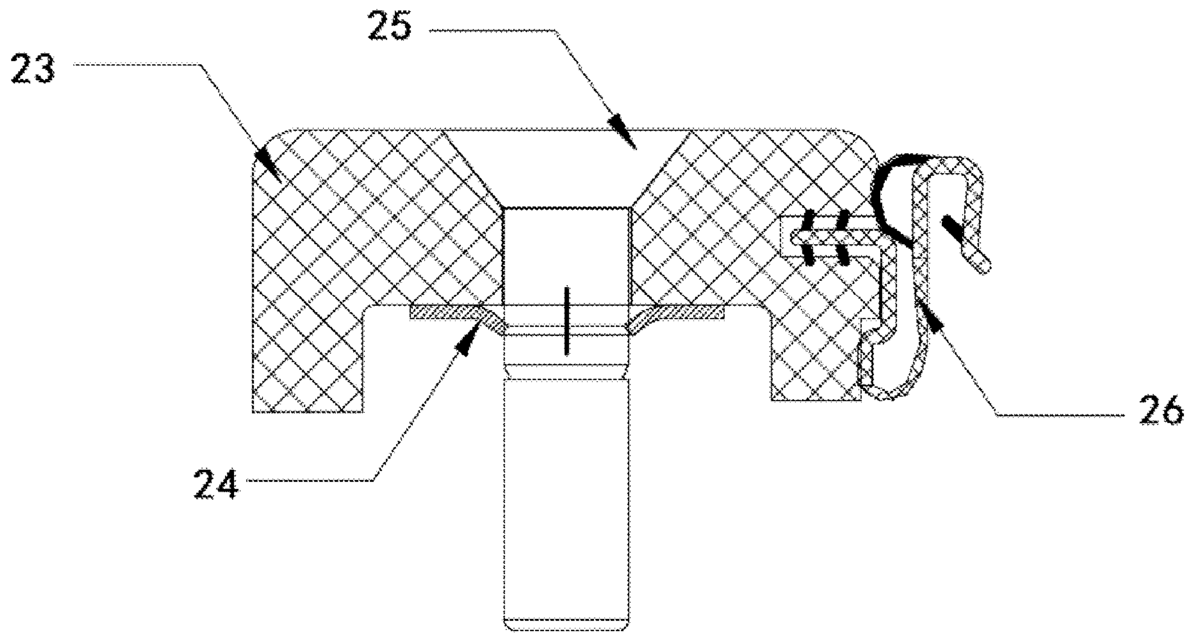
FIG. 5 (Prior Art)
FIG. 5 is a cross section of a rail carrier assembly of the door sill II.
Figure 6:
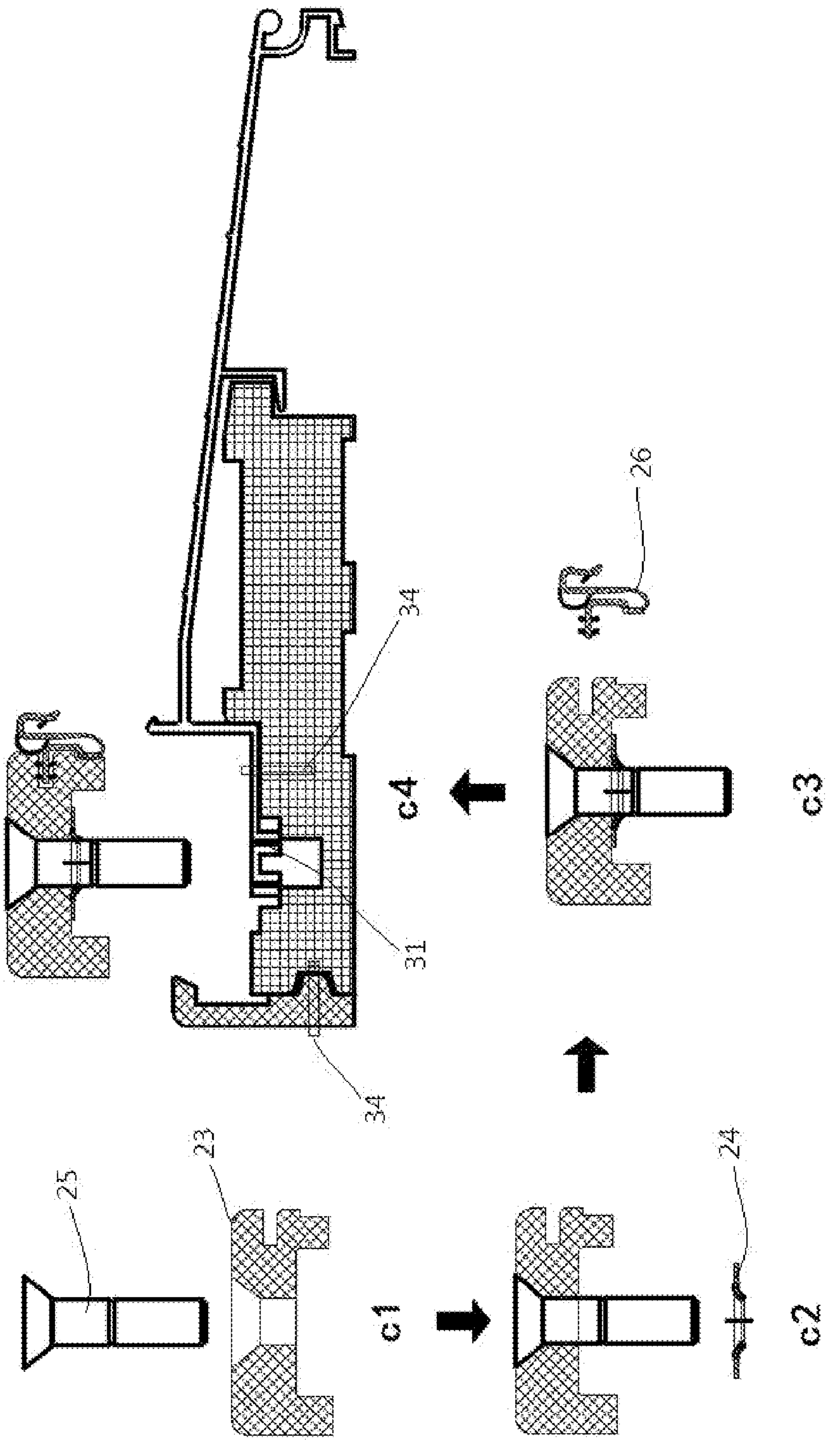
FIG. 6 (Prior Art)
FIG. 6 is a schematic diagram of an assembly process of the rail carrier assembly of the door sill II.
Figure 7:
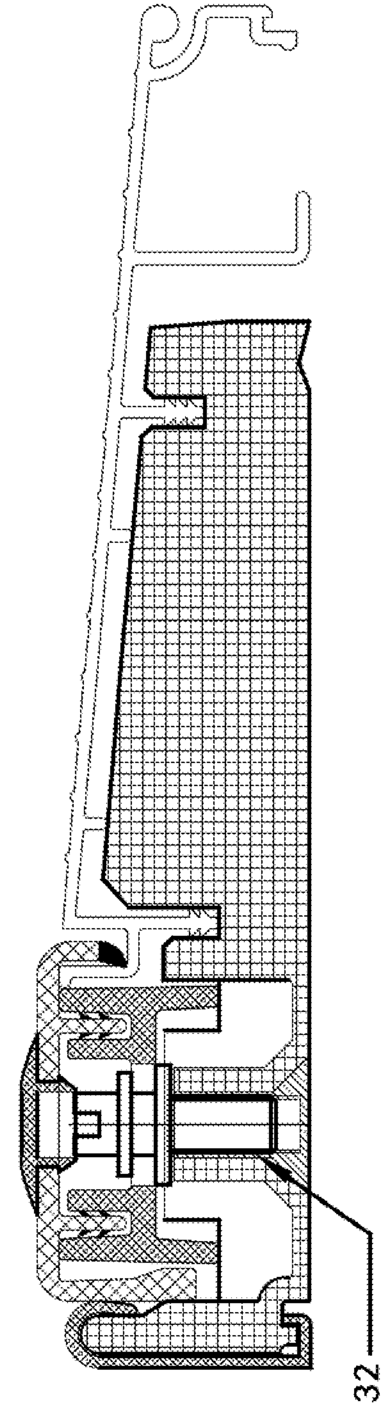
FIG. 7 (Prior Art)
FIG. 7 is a cross section of a door sill III.
Figure 8:
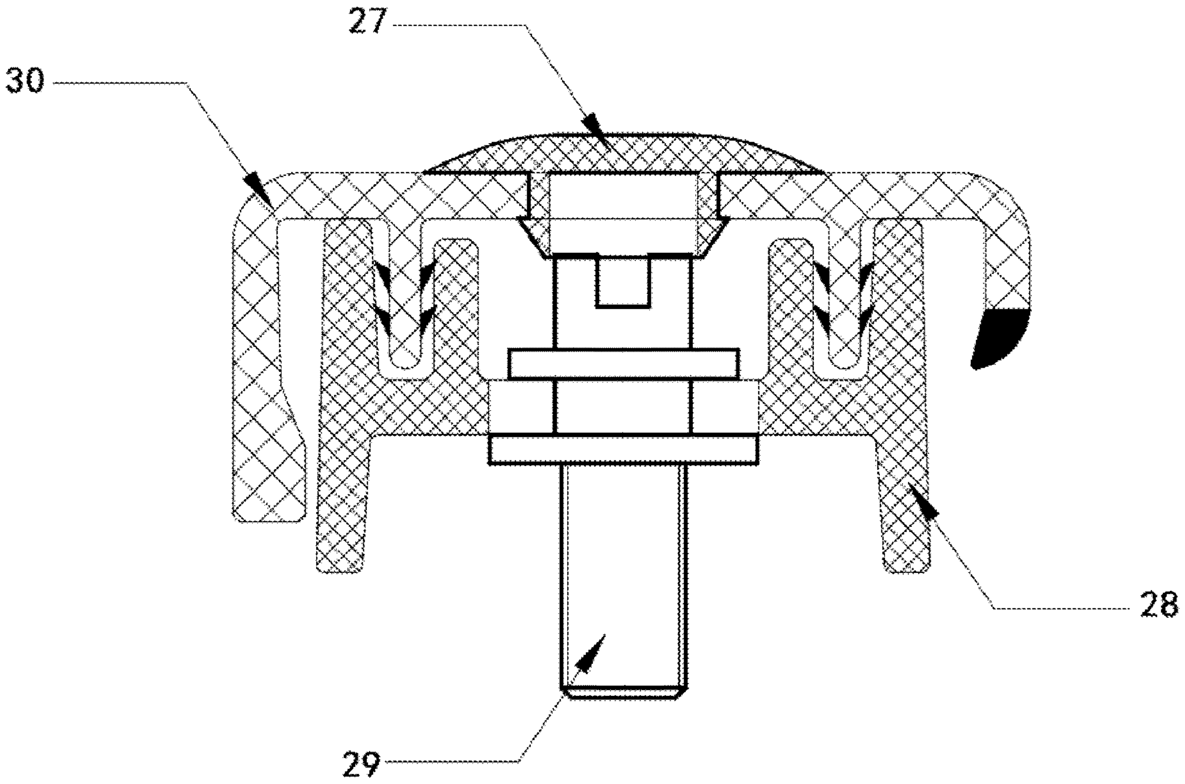
FIG. 8 (Prior Art)
FIG. 8 is a cross section of a rail carrier assembly of the door sill III.
Figure 9:
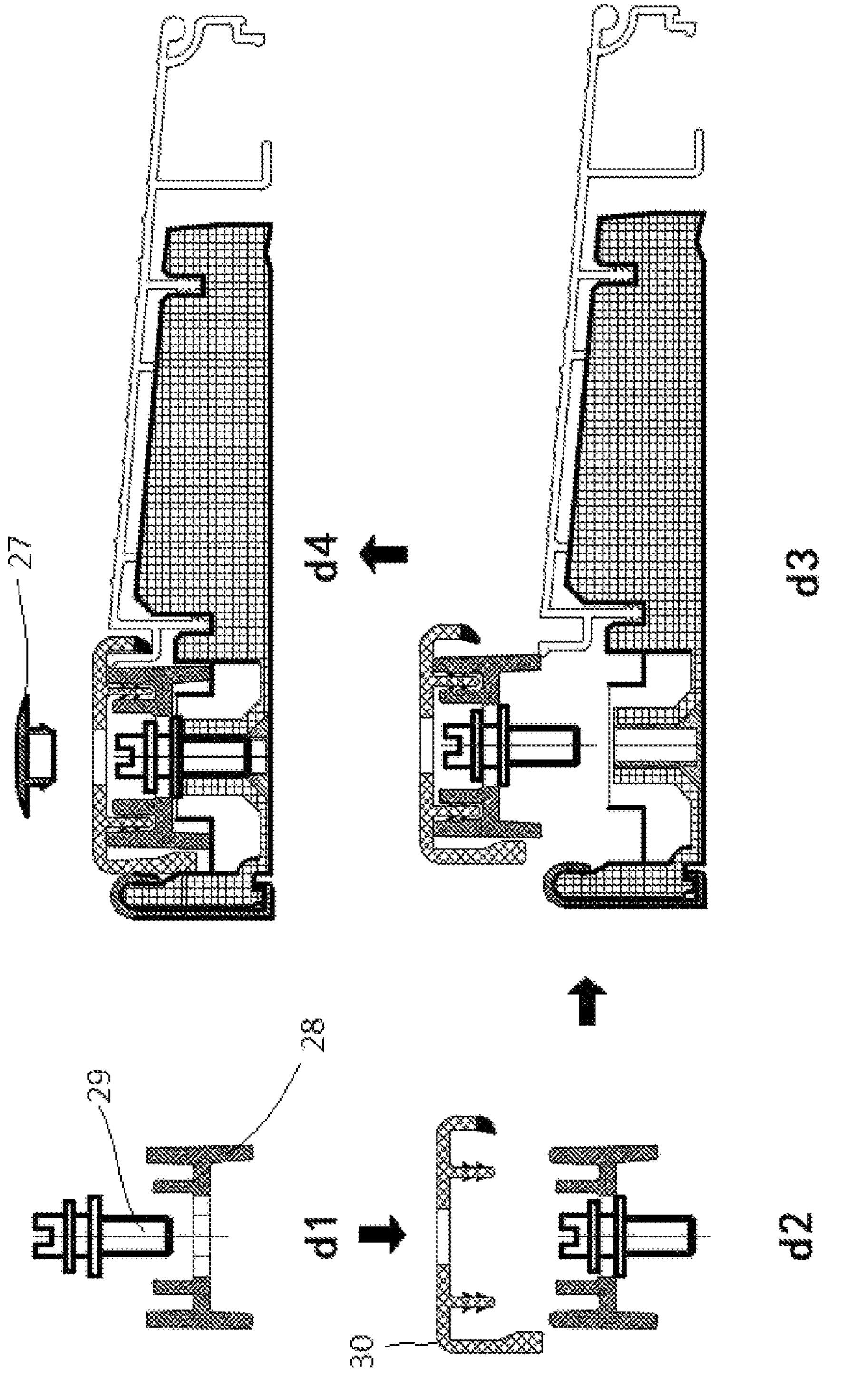
FIG. 9 (Prior Art)
FIG. 9 is a schematic diagram of an assembly process of the rail carrier assembly of the door sill III.

Based on the differences in the assembly process of the rail carrier assembly between the present invention and the three existing door sills, it can be seen that:

Compared with the door sill I shown in FIGS. 1-3, the assembly process of the rail carrier assembly of the present invention is significantly simplified, and the assembling difficulty is reduced. Compared with the door sill II shown in FIGS. 4-6, in addition to the simplified assembly process and the reduced assembling difficulty, the processing of the nut structure on the sill deck profile is avoided. The processing difficulty of the nut structure is much higher than that of the flange nut 38 of the present invention. A defective nut structure can lead to the scrapping of the entire sill deck profile, whereas the scrapping cost of the flange nut 38 is relatively controllable even if there is a defective product. In addition, the side cap of the door sill II and the base need to be sealed through a colloid and/or fixed through a crown staple 34. Finally, compared with the door sill III, in addition to the simplified assembly process and the reduced assembling difficulty, the processing of the adjustment screw III 29 or the processing of the specially-shaped hole in the rail carrier III 28 caused by the embedment structure between the rail carrier III 28 and the adjustment screw III 29 is also avoided. Similarly, the processing of the nut structure on the sill deck profile required in the door sill III is avoided in the present invention. Based on the above, in general, the technical solution of the present invention is beneficial to the improvement of processing efficiency of the product and the cost control of the product.

Based on the embodiments above, it is apparent that the height-adjustable door sill disclosed in the present invention can effectively overcome the defects in the existing similar products, and is developed in the product performance and production process of the door sill. The door sill is simple and efficient to assemble, and is practical, aesthetic and vapor-proof. The production efficiency of the door sill can be effectively improved, and the production cost is controlled, so that the production demands of the enterprises are satisfied.

The foregoing descriptions are merely preferable specific implementations of the present invention, but the protection scope of the present invention is not limited thereto. Any variation or replacement readily figured out by those skilled in the art within the technical scope disclosed in the present invention shall fall within the protection scope of the present invention.

What is claimed is:

1. A door sill, comprising a sill deck (1) and an adjustable rail carrier assembly (2), wherein:

the adjustable rail carrier assembly (2) is configured on the sill deck (1);

the rail carrier assembly (2) includes a rail cap (3), a rail carrier (4), a flange nut (38) and an adjustment screw (6);

the rail carrier (4), which has an H-shaped cross section, includes a vertical pair of legs, a bar extending horizontally to connect the pair of legs and a nut installation tunnel (8) which traverses the bar;

the flange nut (38) includes a threaded bore (5), a limiting flange (9) around a lower end of the threaded bore (5) and a plurality of spikes (10) rising from the limiting flange (9);

the threaded bore (5) is plugged into the nut installation tunnel (8);

the plurality of spikes (10) are implanted into the bar;

a groove (7) is formed in one side of the sill deck (1);

the groove (7) is configured to match with the rail carrier assembly (2) for the rail carrier (4) to fit in the groove (7);

a lower portion of the pair of legs remains within the groove (7) despite when the rail carrier (4) is elevated to its highest position;

the pair of legs stand on a bottom surface of the groove (7) when the rail carrier (4) is dropped to its lowest position;

the rail cap (3), which is arranged along an extension direction of the rail carrier (4), removably joins to the rail carrier (4) at an upper end of the pair of legs;

the adjustment screw (6) is in threaded fit only with the threaded bore (5);

a lower surface of the adjustment screw (6) is pressed against the bottom surface of the groove (7); and the adjustment screw (6) is configured to drive the flange nut (38) to move up or down in an axial direction of the adjustment screw (6) through rotation, thereby altering the height of the rail carrier (4) fitted in the groove (7) and altering the height of the rail cap (3).

2. The door sill in claim 1, wherein: the adjustment screw (6) joins to the flange nut (38) only through a bottom of the rail carrier.

3. The door sill in claim 1, wherein:

the adjustment screw (6) includes an upper screw head (16) and a lower screw head (17);

the upper screw head (16) has an outer diameter equal to a diameter of the adjustment screw (6); and the lower screw head (17) has an outer diameter greater than the diameter of the adjustment screw (6).

4. The door sill in claim 1, wherein the plurality of spikes (10) are evenly distributed in a circumferential direction.

5. The door sill in claim 1, wherein:

at least two nut installation tunnels (8) are formed in the rail carrier (4); and the threaded bores (5) and the adjustment screws (6) are correspondingly assembled in the nut installation tunnels (8).

6. The door sill in claim 1, wherein the rail carrier (4) extends continuously along a horizontal direction across the groove (7).

7. The door sill in claim 1, wherein:

the rail carrier (4) is of a segmented type;

the segmented rail carrier (4) includes a plurality of rail carrier units (35);

the plurality of rail carrier units (35) are arranged at intervals along a horizontal direction of the groove (7);

the nut installation tunnel (8) is formed in the rail carrier unit (35); and the threaded bore (5) and the adjustment screw (6) are correspondingly assembled in the nut installation tunnel (8).

8. The door sill in claim 7, wherein:

the rail carrier (4) includes exactly two rail carrier units (35); and the two rail carrier units (35) are symmetrically arranged at both ends of the groove (7) along the horizontal direction.

9. The door sill in claim 7, wherein:

the rail carrier (4) includes at least three rail carrier units (35);

a pair of the rail carrier units (35) are symmetrically arranged at both ends of the groove (7) along the horizontal direction; and the other rail carrier units (35) are arranged at intervals between the pair of the rail carrier units (35).

10. The door sill in claim 7, wherein a cross section of each of the rail carrier units (35) is H-shaped.

11. The door sill in claim 9, wherein a cross section of the pair of the rail carrier units (35) is H-shaped.

12. The door sill in claim 1, wherein:

arms (13) are symmetrically arranged on a lower surface of the rail cap (3); and a recess is formed in the upper end of the pair of legs to form a clamp (14) for engaging the arms (13).

13. The door sill in claim 1, wherein screwdriver bit holes are formed in both ends of the adjustment screw (6) for assembly and rotation.

14. The door sill in claim 13, wherein the screwdriver bit holes include a slotted hole, a Phillips hole or a polygon socket hole.

15. The door sill in claim 1, wherein both ends of the adjustment screw (6) are polygon flange bolt heads.

16. The door sill in claim 1, wherein:

a removal groove (11) is formed in one end of the rail cap (3); and the other end of the rail cap (3) bends in an L shape in relation to an end surface of the rail cap (3) and extends to form a guard plate (12).

17. The door sill in claim 16, wherein: the rail cap (3), which spans from the removal groove (11) up to the guard plate (12), is a seamless object impervious to dirt and liquids.

18. The door sill in claim 16, wherein: a seal (36) is installed on the guard plate (12) and fits closely to a sealing surface (37) at an upper edge of the sill deck (1).

19. The door sill in claim 18, wherein:

the sealing surface (37) is an outer surface of an upper part of the groove (7); and the sealing surface (37) is an outer surface on the right side of the upper part of the groove (7).

20. The door sill in claim 19, wherein: the seal (36) remains in contact with the sealing surface (37) despite when the rail carrier (4) is elevated to its highest position.

* * * * *